United States Patent
Pirrung et al.

(10) Patent No.: US 8,580,876 B2
(45) Date of Patent: Nov. 12, 2013

(54) ENCAPSULATED PHENOLIC ANTIOXIDANTS

(75) Inventors: Frank Oliver Heinrich Pirrung, Gruenstadt (DE); Clemens Auschra, Freiburg (DE); Christof Hasler, Rombach (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/387,246

(22) PCT Filed: Jul. 27, 2010

(86) PCT No.: PCT/EP2010/060915
§ 371 (c)(1),
(2), (4) Date: Jan. 26, 2012

(87) PCT Pub. No.: WO2011/012631
PCT Pub. Date: Feb. 3, 2011

(65) Prior Publication Data
US 2012/0129995 A1 May 24, 2012

(30) Foreign Application Priority Data

Jul. 29, 2009 (EP) .................... 09166672

(51) Int. Cl.
*C08F 293/00* (2006.01)
(52) U.S. Cl.
USPC ........................................ 524/270
(58) Field of Classification Search
USPC ........................................ 525/270
See application file for complete search history.

(56) References Cited

U.S. PATENT DOCUMENTS

2003/0018102 A1 1/2003 Weston et al.
2008/0146448 A1 6/2008 Dyllick-Brenzinger et al.

FOREIGN PATENT DOCUMENTS

| EP | 1 110 999 | 6/2001 |
| JP | 62 74944 | 4/1987 |
| WO | 01 54809 | 8/2001 |
| WO | 2005 023878 | 3/2005 |
| WO | 2006 094526 | 9/2006 |
| WO | 2007 104713 | 9/2007 |
| WO | 2007 147726 | 12/2007 |

OTHER PUBLICATIONS

International Search Report Issued Oct. 19, 2010 in PCT/EP10/60915 Filed Jul. 27, 2010.

*Primary Examiner* — Peter Szekely
(74) *Attorney, Agent, or Firm* — Oblon, Spivak, McClelland, Maier & Neustadt, L.L.P.

(57) ABSTRACT

The present invention pertains to a concentrated aqueous polymer dispersion with an average particle size of less than 1000 nm comprising a polymer carrier, a non-polar organic phenolic antioxidant and a surfactant. The present invention also pertains to a process for the preparation of said concentrated aqueous polymer dispersion, to a polymer powder obtainable from said concentrated aqueous polymer dispersion, to a composition comprising an organic material and said concentrated aqueous polymer dispersion or said polymer powder and to the use of said concentrated aqueous polymer dispersion or said polymer powder as stabilizer for organic material.

14 Claims, No Drawings

ENCAPSULATED PHENOLIC ANTIOXIDANTS

The present invention pertains to a concentrated aqueous polymer dispersion with an average particle size of less than 1000 nm comprising a polymer carrier, a non-polar organic phenolic antioxidant and a surfactant. The present invention also pertains to a process for the preparation of said concentrated aqueous polymer dispersion, to a polymer powder obtainable from said concentrated aqueous polymer dispersion, to a composition comprising an organic material and said concentrated aqueous polymer dispersion or said polymer powder and to the use of said concentrated aqueous polymer dispersion or said polymer powder as stabiliser for organic material.

Non-polar antioxidants (AO) like phenolic antioxidants are state of the art additives to protect coatings, plastics and adhesive formulation against heat induced decomposition during fabrication, application, curing and use. Paints/resins for these applications typically contain up to a few wt % of organic AO relative to the total formulation containing resin.

But unlike solvent-based formulations, in modern water based systems many of the well-established non-polar antioxidants are difficult to incorporate due to insolubility and/or incompatibility with the aqueous formulations. Depending on the type of formulation and the type of AO, it can be impossible to generate a stable uniform mixture. In other cases it can be that the initial homogeneous formulations show instability upon storage with separation of AO and/or other components, and/or phenomena of floating, sedimentation, serum formation, gelation, etc with loss of activity. Such phenomena caused by incompatibility of the antioxidant are detrimental for its performance, due to insufficient and inhomogeneous distribution of the AO. The following approaches are known to overcome the incompatibility problems mentioned above:

AO-molecules can be chemically modified with polar groups in order to enhance water solubility/compatibility and/or to provide the AO molecules with self-emulsifying properties in water. This approach has the disadvantage that the chemical modification usually is complex and rather expensive, and the surfactant-like behaviour of polar modified AO can cause environmental problems as well as lower performance by washing out of the AO residues under wet weathering conditions.

Certain AO molecules can be incorporated already to the binder polymers at the stage of manufacture of the binder polymer, in order to achieve a uniform distribution already in the binder raw material. But this approach is very inflexible, because it requires that the AO does not interfere with any process stage of the manufacture of the binder polymer, like inhibition of chain growth. Also in this case the target amount of AO is fixed with the binder polymer and leaves no freedom to adjust or enhance the AO-level or the type during or after formulation of the paint, plastic, ink or adhesive.

Non-polar AO can be formulated to concentrated stable aqueous emulsions, dispersions or even homogenous liquids (such as Irganox 1520 SE) by the use of relative high amounts of emulsifier surfactants, typically with >10-20% emulsifier surfactants relative to active AO. Such concentrated AO emulsions or dispersions can be used in different aqueous formulations, but the relative high amount of surfactants can impair water sensitivity or adhesion of the compound, as well as strong foam formation and stabilization. Particle sizes of such dispersions are typically in the range of 1 to 10 micron, which means that these particles might become visible in the final formulation after cure, or do not reveal their total potential, as they are coarsely distributed throughout the film.

AO functionalized with a carboxylic acid function, which optionally can be deprotonated with an amine or hydroxide with the purpose to make the molecule water soluble (e.g. Irganox 1310). This approach however has the disadvantage that either, additional amines are added to the formulation potentially leading to side reactions with other coating components (catalysts, additives, . . . ), smell, or volatile organic emissions, or the resulting alkali salts of the AO-residuals give rise to a permanent water sensitivity of the final coating, ink or adhesive.

Further, phenolic antioxidants like BHT (3,5-Di-tert-butyl-4-hydroxytoluol) are used as stabilizer for acrylic monomers at a level of up to 1000 ppm, to avoid self polymerization of the monomer upon warm storage conditions. It acts in this way as a radical quencher. Surprisingly in this polymerization, no apparent quenching of the radical stream was observed at levels of equal weight amounts of sterically hindered phenol versus the acrylic monomer. Residual acrylic monomer contents are typically found below 2000 ppm, preferably below 500 ppm in the final product.

For instance the concentration of non-polar phenolic antioxidant in the polymer matrix, which serves as a carrier, should be as high as possible in order to add as little as possible of undesired material, which can adversely affect stabilising properties, to the coating, ink or plastic composition.

It has now been found that concentrated aqueous polymer dispersions with a particle size of less than 1000 nm can be prepared by heterophase radical polymerization of ethylenically unsaturated monomers in the presence of phenolic antioxidant, wherein the weight ratio between phenolic antioxidant and polymer carrier is greater than 30 parts of phenolic antioxidant to 100 parts of the polymer carrier.

The present invention pertains to a concentrated aqueous polymer dispersion with an average particle size of less than 1000 nm comprising a) a polymer carrier prepared by heterophase radical polymerization of at least one ethylenically unsaturated monomer in the presence of b) an organic phenolic antioxidant (e.g. a non-polar organic phenolic antioxidant), and c) a non-ionic, cationic or anionic surfactant, preferably a non-ionic or cationic surfactant, wherein the weight ratio of non-polar phenolic antioxidant to polymer carrier is equal to or greater than 30 parts of phenolic antioxidant per 100 parts of carrier and, for instance, the residual monomer content of the polymer carrier is below 2000 ppm.

For instance, the phenolic antioxidant (b) does not comprise a group of formula

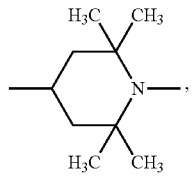

especially does not comprise a group of formula

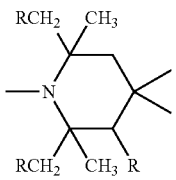

in which R is hydrogen or methyl,
in particular, does not comprise a group of formula

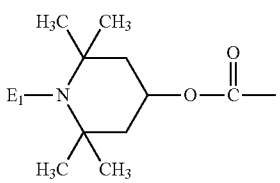

in which $E_1$ is hydrogen, $C_1$-$C_8$alkyl, O, —OH, —CH$_2$CN, $C_1$-$C_{18}$alkoxy, $C_5$-$C_{12}$cycloalkoxy, $C_3$-$C_6$alkenyl, $C_7$-$C_9$-phenylalkyl unsubstituted or substituted on the phenyl by 1, 2 or 3 $C_1$-$C_4$alkyl; or $C_1$-$C_8$acyl,
for instance is not bis(1,2,2,6,6-pentamethyl-4-piperidyl) n-butyl-3,5-di-tert-butyl-4-hydroxybenzylmalonate.

For instance, the weight ratio of non-polar organic phenolic antioxidant to polymer carrier is equal or greater than 50 parts per 100 parts of carrier, preferably equal or greater than 80 parts per 100 parts of carrier, most preferably equal or greater than 90 parts per 100 parts of carrier.

For instance, the weight ratio of non-polar organic phenolic antioxidant to polymer carrier is equal or lower than 1900 parts per 100 parts of carrier, preferably equal or lower than 900 parts per 100 parts of carrier, more preferably equal or lower than 300 parts per 100 parts of carrier, most preferably equal or lower than 200 parts per 100 parts of carrier.

For instance, the average particle size is less than 500 nm, preferably less than 250 nm. For instance, the minimum average particle size is 25 nm, preferably 50 nm.

Droplet (oil/water emulsion) as well as particle (polymer dispersion) size can be measured by using dynamic light scattering (DLS) technique (also known as photon correlation spectroscopy (PSC) or quasi-elastic light scattering (QELS)). For this kind of measurement a NICOMP particle sizer (NICOMP Model 380, Particle Sizing System, Santa Barbara, Calif., USA) with a fixed scattering angle of 90° can be used for example. The measurement leads to the mean diameter $D_{INT}$ (intensity weighted). For instance, the average particle size is the mean intensity diameter determined by dynamic light scattering at 90° scattering angle.

For example, the residual monomer content of the polymer carrier is below 500 ppm, preferably below 250 ppm, more preferably below 100 ppm, most preferably below 50 ppm.

For example, the residual monomer content of the polymer carrier is the residual content of ethylenically unsaturated monomer. For instance, the residual monomer content of the polymer carrier is equal to or greater than 0 ppm.

The total solids content of the concentrated aqueous polymer dispersion is for example more than 20%, for instance more than 30% and preferably more than 35% by weight based on the total weight of the aqueous dispersion. The total solids content of the concentrated aqueous polymer dispersion is for instance less than 95%, for example less than 80%, especially less than 60% by weight based on the total weight of the aqueous dispersion.

Preferably, the non-polar phenolic antioxidant has a water solubility of less than 3% by weight, preferably less than 1% by weight, most preferably less than 0.1% by weight, at room temperature and atmospheric pressure. For instance, the non-polar phenolic antioxidant has a water solubility of equal to or greater than 0% by weight.

The right balance between solubility in water and solubility in the monomer droplets influences strongly the polymerization result. Therefore the polarity of the non-polar phenolic antioxidant can also be expressed in terms of log p. The partition coefficient log p (octanol/water) is a widely used parameter for example in rating the environmental impact of chemical compounds. Its calculation is described by W. M. Meylan, P. H. Howard in J. Pharmaceutical Sciences 84, (1995), 83-92.

In the context of the present invention the non-polar phenolic antioxidant has preferably a log p value of more than log p=2.

For instance, the non-polar phenolic antioxidant is soluble in the monomer mixture at a concentration at least 5% by weight based on the weight of the monomer mixture, preferably, the non-polar phenolic antioxidant is completely soluble in the monomer mixture, especially at polymerisation temperature.

For example, the non-polar phenolic antioxidant is liquid at polymerisation temperature, particularly, the non-polar phenolic antioxidant is liquid at room temperature. For instance, the non-polar phenolic antioxidant has a melting point of less than 80° C.

For example, the non-polar phenolic antioxidant is solid at room temperature but soluble in the monomer mixture at temperatures of below 80° C., especially soluble in the monomer mixture at room temperature.

Preferably more than one ethylenically unsaturated monomer is used. When the polymerization is carried out with two or more monomers, at least one may carry two unsaturated functionalities in order to provide a certain degree of crosslinking. For example the amount of the difunctional monomer may vary from 0.5 to 20% by weight based on the total weight of the monomer mixture.

For instance, the ethylenically unsaturated monomer has a water solubility of from 0 to 5%.

For example the ethylenically unsaturated monomer is selected from the group consisting of acrylic sulphonic acid (e.g. 2-acrylamido-2-methylpropane sulphonic acid), styrene, substituted styrene, conjugated dienes, acrolein, vinyl toluene, vinyl acetate, vinylpyrrolidone, vinylimidazole, maleic anhydride, (alkyl)acrylic acidanhydrides, (alkyl) acrylic acid, (alkyl)acrylic acid salts, (alkyl)acrylic esters, (alkyl)acrylonitriles, (alkyl)acrylamides, vinyl halides, vinylidene halides, (alkyl)acrylates functionalised with OH, polyethergroups or aminic groups, alkanediol diacrylate and mixtures thereof, preferably the ethylenically unsaturated monomer is selected from the group consisting of (alkyl) acrylic acid, (alkyl)acrylic ester, alkanediol diacrylate and mixtures thereof. Mixtures thereof are particularly preferred.

For instance the ethylenically unsaturated monomer is a compound of formula $CH_2$=$C(R_a)$—(C=Z)—$R_b$, wherein Z is O or S; $R_a$ is hydrogen or $C_1$-$C_4$alkyl, $R_b$ is $NH_2$, O$^-$ (Me$^+$), glycidyl, unsubstituted $C_1$-$C_{20}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl)amino, —O—$CH_2$—$CH_2$—N($CH_3$)$_2$ or —O—$CH_2$—$CH_2$—$N^+H(CH_3)_2 An^-$;

$An^-$ is a anion of a monovalent organic or inorganic acid;

Me is a monovalent metal atom or the ammonium ion.

Examples for specific ethylenically unsaturated monomers are styrene, n-butylmethacrylate, tert-butylmethacrylate, methylacrylate, ethylmethacrylate, propyl-methacrylate, hexylmethacrylate, 1,4-butanediol dimethacrylate, ethylene glycol di-methacrylate or hydroxyethylmethacrylate, ethylhexyl methacrylate, iso-butylmethacrylate, cyclohexylmethacrylate, methylmethacrylate, stearylmethacrylate, acrylic acid, methacrylic acid, benzylmethacrylate, vinyl toluene, ethylhexylacrylate, iso-butylacrylate, benzylacrylate, cyclohexylacrylate, hydroxyethylacrylate, methylacrylate, stearylacrylate, n-butylacrylate, tert-butylacrylate, methylacrylate, ethylacrylate, propylacrylate, hexylacrylate, 1,4-butanediol diacrylate, ethylene glycol diacrylate or hydroxy-ethylacrylate, especially methylmethacrylate, stearylmethacrylate, butanediol diacrylate and methacrylic acid.

A particular suitable monomer mixture is a mixture of methylmethacrylate, stearylmethacrylate, butanediol diacrylate and methacrylic acid.

Examples of acids from which the anion $An^-$ is derived are $C_1$-$C_{12}$-carboxylic acids, organic sulfonic acids such as $CF_3SO_3H$ or $CH_3SO_3H$, mineralic acids such as HCl, HBr or HI, oxo acids such as $HClO_4$ or complex acids such as $HPF_6$ or $HBF_4$.

For instance, $R_a$ is hydrogen or methyl, $R_b$ is $NH_2$, glycidyl, unsubstituted or with hydroxy substituted $C_1$-$C_{20}$alkoxy, unsubstituted $C_1$-$C_4$alkylamino, di($C_1$-$C_4$alkyl)amino, hydroxy-substituted $C_1$-$C_4$alkylamino or hydroxy-substituted di($C_1$-$C_4$alkyl)amino; and Z is oxygen.

Acrylic acid esters and methacrylic acid esters are typically $C_1$-$C_{20}$alkyl esters.

For example, the ethylenically unsaturated monomer is selected from the group consisting of $C_1$-$C_{20}$alkyl acrylates, $C_1$-$C_{20}$alkyl methacrylates, acrylic acid, methacrylic acid, styrene, vinyltoluene, hydroxy-functional acrylates or methacrylates, acrylates or methacrylates derived from alkoxylated alcohols and multifunctional acrylates or methacrylates or mixtures thereof.

Particularly useful methacrylates are methylmethacrylate and stearylmethacrylate. In a specific embodiment the concentrated aqueous polymer dispersion is prepared from a mixture of at least two of the above monomers and at least one monomer which is bifunctional, so that a crosslinked polymer is obtained. The amount of bifunctional monomer is for example from 0.5 to 20 weight-%, based on the weight of the sum of monomers.

Typical examples for bifunctional monomers are divinylbenzene, ethylenglycol diacrylate, butanediol diacrylate, 1,4-butanediol dimethacrylate, ethylene glycol dimethacrylate, diethyleneglycol dimethacrylate or diethyleneglycol diacrylate, especially butanediol diacrylate.

For instance, the phenolic antioxidant (b) comprises one or more mono-hydroxyphenyl (i.e. "phenol") moieties and one or more aliphatic or aromatic substituents (such as anchor groups) or linking groups connecting them, with cyclic moieties present in the compound being purely carbocyclic or selected from those of the formulae (lines denoting bonds)

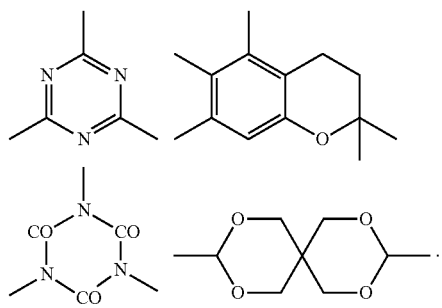

For example, each mono-hydroxyphenyl moiety present may contain one or two linking bonds to either a group connecting the moiety with 1 to 3 further moieties of the same type (linking group) or to an anchor group, and optionally 1-3 further substituents, e.g. alkyl of 1 to 12 carbon atoms.

Preferred substituents on the mono-hydroxyphenyl moiety are methyl or tertiary $C_4$-$C_{12}$alkyl, especially methyl, tert.-butyl and tert.-pentyl.

Linking groups are usually di-, tri- or tetravalent aliphatic groups of 1 to 20 carbon atoms, such as divalent groups selected from
alkylene which may be interrupted and/or end-capped with —O—, —NH—, —S—, —CO—, —COO—, —OCO—, —NHCO—, —CONH—, a group $L_1$, phenylene, phenylene which is substituted by $C_1$-$C_{12}$alkyl and/or $C_1$-$C_{12}$alkoxy and/or $C_2$-$C_{12}$alkanoyloxy and/or $C_3$-$C_{12}$alkenoyloxy; divalent mono-, di- or tricycloalkylene groups; divalent mono-, di- or tricycloalkylene groups interrupted by —O—; spacer groups —O—; —NH—; —S—; —CO—; —COO—; —OCO—; —NHCO—; —CONH—;
trivalent groups selected from
trivalent alkyl groups of 3 to 20 carbon atoms; said trivalent alkyl groups interrupted and/or end-capped with —O—, —NH—, —S—, —CO—, —COO—, —OCO—, —NHCO—, —CONH—, a group $L_1$, phenylene, phenylene which is substituted by $C_1$-$C_{12}$alkyl and/or $C_1$-$C_{12}$alkoxy and/or $C_2$-$C_{12}$alkanoyloxy and/or $C_3$-$C_{12}$alkenoyloxy; or trivalent groups of the formulae

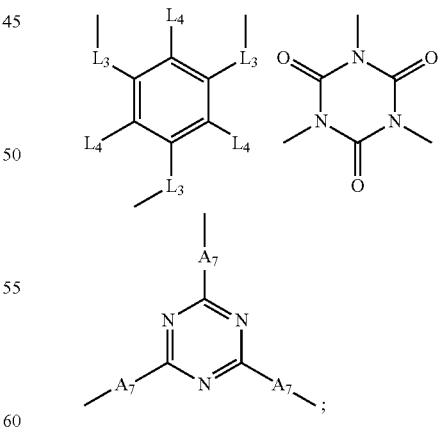

tetravalent alkyl groups of 4 to 20 carbon atoms; said tetravalent alkyl groups interrupted and/or end-capped with —O—, —NH—, —S—, —CO—, —COO—, —OCO—, —NHCO—, —CONH—, a group $L_1$, phenylene, phenylene which is substituted by $C_1$-$C_{12}$alkyl and/or $C_1$-$C_{12}$alkoxy and/or $C_2$-$C_{12}$alkanoyloxy and/or $C_3$-$C_{12}$alkenoyloxy;

$L_1$ is a group selected from the formulae

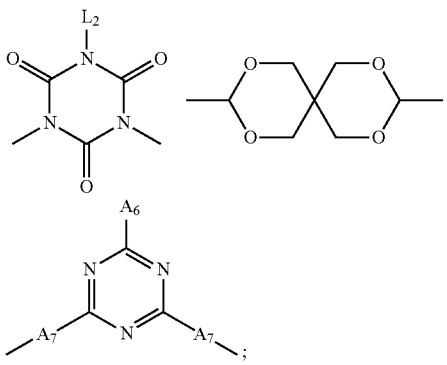

$L_2$ is OH, $C_1$-$C_{12}$alkyl, $C_1$-$C_{12}$alkoxy, $C_2$-$C_{12}$hydroxyalkyl; $C_2$-$C_{12}$hydroxyalkoxy;
$L_3$ independently are $C_1$-$C_4$alkylene;
$L_4$ independently are H or $C_1$-$C_4$alkyl; and
$A_6$ and $A_7$ are as defined for anchor groups below.

Anchor groups are usually selected from $C_1$-$C_{22}$alkyl; $C_1$-$C_{22}$alkyl-$A_5$-; $C_2$-$C_{22}$alkyl interrupted by -$A_5$-; -$A_4$-phenyl; -$A_4$-phenyl where the phenyl core is substituted by $C_1$-$C_{12}$alkyl, $C_1$-$C_{12}$alkoxy, $C_2$-$C_{12}$alkanoyloxy and/or $C_3$-$C_{12}$alkenoyloxy; $C_1$-$C_8$alkyl substituted by phosphite, phosphate or phosphonate ester groups, e.g. of the formula

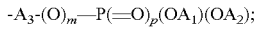

or the anchor group is of the formula

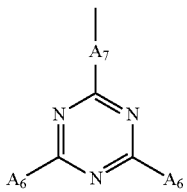

where m and p independently are 0 or 1;
$A_1$ and $A_2$ independently are $C_1$-$C_{12}$alkyl or phenyl or phenyl substituted by $C_1$-$C_{12}$alkyl or an equivalent of an alkaline, alkaline earth or aluminum atom;
$A_3$ is a direct bond or $C_1$-$C_8$alkylene;
$A_4$ is selected from $C_1$-$C_8$alkylene and $A_5$;
$A_5$ is selected from —O—, —NH—, —S—, —CO—, —COO—, —OCO—, —NHCO—, —CONH—;
$A_6$ is selected from $C_1$-$C_{18}$alkoxy, $C_1$-$C_{18}$alkylthio and $C_1$-$C_{18}$alkylamino;
$A_7$ is —O— or —NH—;
or the anchor group is $C_3$-$C_{22}$alkylene or $C_3$-$C_{22}$oxaalkylene attached with both open bonds to adjacent carbon atoms of the mono-hydroxyphenyl moiety.

If the anchor group is attached to the phenol moiety by a carbon atom, this carbon atom is preferably quaternary carbon (i.e. carbon containing no bond to hydrogen).

Preferred anchor groups are tertiary $C_4$-$C_{12}$alkyl; $C_1$-$C_{22}$alkyl-$A_5$-; $C_2$-$C_{22}$alkyl interrupted by -$A_5$-; -$A_5$-phenyl; -$A_5$-phenyl where the phenyl core is substituted by $C_1$-$C_{12}$alkyl; -$A_4$-phenyl where the phenyl core is substituted by $C_2$-$C_{12}$alkanoyloxy and/or $C_3$-$C_{12}$alkenoyloxy, and optionally further by $C_1$-$C_{12}$alkyl; or the anchor group is $C_3$-$C_{22}$alkylene or $C_3$-$C_{22}$oxaalkylene attached with both open bonds to adjacent carbon atoms of the mono-hydroxyphenyl moiety; or is a group of one the formulae

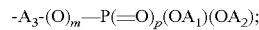

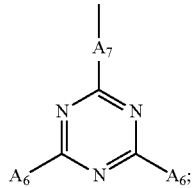

where m and p independently are 0 or 1;
$A_1$ and $A_2$ independently are $C_1$-$C_{12}$alkyl or phenyl or phenyl substituted by $C_1$-$C_{12}$alkyl or an equivalent of an alkaline, alkaline earth or aluminum atom;
$A_3$ is a direct bond or $C_1$-$C_8$alkylene;
$A_4$ is selected from $C_1$-$C_8$alkylene, —O—, —NH—, —S—, —CO—, —COO—, —OCO—, —NHCO—, —CONH—;
$A_5$ is selected from —O—, —NH—, —S—, —CO—, —COO—, —OCO—, —NHCO—, —CONH—;
$A_6$ is selected from $C_1$-$C_{18}$alkoxy, $C_1$-$C_{18}$alkylthio and $C_1$-$C_{18}$alkylamino;
$A_7$ is —O— or —NH—.

Anchor or linking groups often contain one or more spacers such as —O—, —NH—, —S—, —CO—, —COO—, —OCO—, —NHCO—, —CONH—, phenylene, or substituted phenylene; these groups may be linked together; however, usually no —O—O— (peroxo) or —NH—O— or —NH—S— or —O—S— linkage is formed.

Alkylene groups end-capped by $A_5$ are, for example, -alkylene-$A_5$-, -$A_5$-alkylene, -$A_5$-alkylene-$A_5$-.

In phosphite, phosphate or phosphonate ester groups, $A_1$ and $A_2$ independently preferably are $C_1$-$C_{12}$alkyl an equivalent of an alkaline, alkaline earth or aluminum atom. Preferred salts are those wherein only one of $A_1$ and $A_2$ is an equivalent of a metal atom, e.g. selected from Li, Na, K, ½ Mg, ½ Ca, ⅓ Al, especially ½ Ca. More preferred are phosphates where p is 1, especially phosphonates where m is 0 and p is 1 or corresponding salts.

For example, the phenolic antioxidant (b) is of the formula (A)

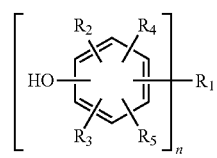

wherein
$R_2$, $R_3$, $R_4$ and $R_5$ independently are hydrogen, $C_5$-$C_8$cycloalkyl, $C_1$-$C_{12}$alkyl, or $C_1$-$C_{12}$alkyl substituted by S—$C_1$-$C_{12}$alkyl, O—$C_1$-$C_{12}$alkyl, CO—O—$C_1$-$C_{12}$alkyl and/or O—CO—$C_1$-$C_{12}$alkyl (e.g. methyl, tertiary $C_4$-$C_{12}$alkyl or methyl substituted by S—$C_4$-$C_{12}$alkyl, especially methyl, tert.-butyl, tert.-pentyl, or methyl substituted by S-linear-$C_4$-$C_{12}$alkyl);
n is from the range 1-4 (e.g. 1, 2 or 4):
when n is 1,
$R_1$ is tertiary $C_4$-$C_{12}$alkyl; $C_1$-$C_{22}$alkyl-$A_5$-; $C_2$-$C_{22}$alkyl interrupted by -$A_5$-; -$A_5$-phenyl; -$A_5$-phenyl where the phenyl core is substituted by $C_1$-$C_{12}$alkyl; -$A_4$-phenyl where the phenyl core is substituted by $C_2$-$C_{12}$alkanoyloxy and/or $C_3$-$C_{12}$alkenoyloxy, and optionally further by $C_1$-$C_{12}$alkyl; or $R_1$ together with $R_5$ is $C_3$-$C_{22}$alkylene or $C_3$-$C_{22}$oxaalkylene attached with both open bonds to adjacent carbon atoms of the mono-hydroxyphenyl moiety; or is a group of one the formulae -$A_3$-(O)$_m$—P(=O)$_p$(OA$_1$)(OA$_2$);

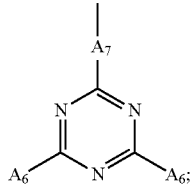

where m and p independently are 0 or 1;
$A_1$ and $A_2$ independently are $C_1$-$C_{12}$alkyl or phenyl or phenyl substituted by $C_1$-$C_{12}$alkyl or an equivalent of an alkaline, alkaline earth or aluminum atom;
$A_3$ is a direct bond or $C_1$-$C_8$alkylene;
$A_4$ is selected from $C_1$-$C_8$alkylene, —O—, —NH—, —S—, —CO—, —COO—, —COO—, —NHCO—, —CONH—;
$A_5$ is selected from —O—, —NH—, —S—, —CO—, —COO—, —COO—, —NHCO—, —CONH—;
$A_6$ is selected from $C_1$-$C_{18}$alkoxy, $C_1$-$C_{18}$alkylthio and $C_1$-$C_{18}$alkylamino;
$A_7$ is —O— or —NH—;
when n is 2, $R_1$ is $C_1$-$C_{20}$alkylene which may be interrupted and/or end-capped with —O—, —NH—, —S—, —CO—, —COO—, —COO—, —NHCO—, —CONH—, -$L_1$-, phenylene and/or phenylene which is substituted by $C_1$-$C_{12}$alkyl and/or $C_1$-$C_{12}$alkoxy and/or $C_2$-$C_{12}$alkanoyloxy and/or $C_3$-$C_{12}$alkenoyloxy;
divalent mono-, di- or tricycloalkylene groups; divalent mono-, di- or tricycloalkylene groups interrupted by —O—; spacer groups —O—; —NH—; —S—; —CO—; —COO—; —COO—; —NHCO—; —CONH—;
when n is 3, $R_1$ is trivalent alkyl of 3 to 20 carbon atoms; said trivalent alkyl interrupted or end-capped with —O—, —NH—, —S—, —CO—, —COO—, —COO—, —NHCO—, —CONH—, -$L_1$-, phenylene, phenylene which is substituted by $C_1$-$C_{12}$alkyl and/or $C_1$-$C_{12}$alkoxy and/or $C_2$-$C_{12}$alkanoyloxy and/or $C_3$-$C_{12}$alkenoyloxy; or trivalent groups of the formulae

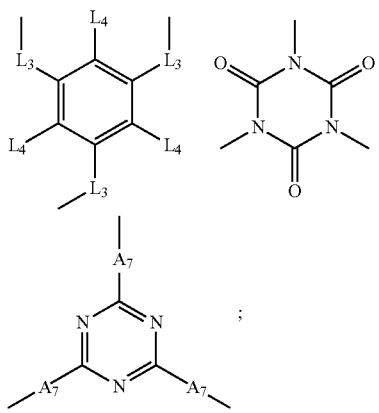

when n is 4, $R_1$ is tetravalent alkyl of 4 to 20 carbon atoms; or said tetravalent alkyl interrupted or end-capped with —O—, —NH—, —S—, —CO—, —COO—, —OCO—, —NHCO—, —CONH—, -$L_1$-, phenylene and/or phenylene which is substituted by $C_1$-$C_{12}$alkyl and/or $C_1$-$C_{12}$alkoxy and/or $C_2$-$C_{12}$alkanoyloxy and/or $C_3$-$C_{12}$alkenoyloxy;
$L_1$ is a group selected from the formulae

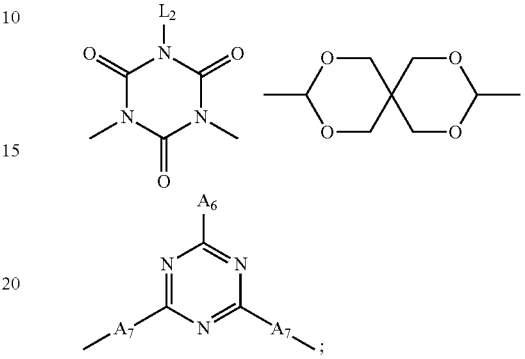

$L_2$ is OH, $C_1$-$C_{12}$alkyl, $C_1$-$C_{12}$alkoxy, $C_2$-$C_{12}$hydroxyalkyl; $C_2$-$C_{12}$hydroxyalkoxy;
$L_3$ independently are $C_1$-$C_4$alkylene;
$L_4$ independently are H or $C_1$-$C_4$alkyl.
Especially preferred are those wherein
$R_2$, $R_3$, $R_4$ and $R_5$ independently are hydrogen, methyl, tert.-butyl, tert.-pentyl, or methyl substituted by S—$C_4$-$C_{12}$alkyl;
when n is 1,
$R_1$ is tertiary butyl, tertiary pentyl; $C_1$-$C_{22}$alkyl-$A_5$-; $C_2$-$C_{22}$alkyl interrupted by -$A_5$-; -$A_5$-phenyl where the phenyl core is substituted by $C_1$-$C_{12}$alkyl; -$A_4$-phenyl where the phenyl core is substituted by $C_3$-$C_4$alkenoyloxy and $C_1$-$C_{12}$alkyl; or $R_1$ together with $R_5$ is $C_3$-$C_{22}$alkylene or $C_3$-$C_{22}$oxaalkylene attached with both open bonds to adjacent carbon atoms of the mono-hydroxyphenyl moiety; or $R_1$ is a group of one the formulae

-$A_3$-P(=O)(OA$_1$)(OA$_2$);

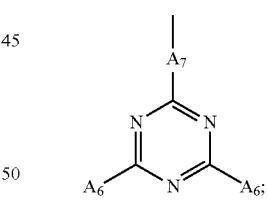

$A_1$ and $A_2$ independently are $C_1$-$C_4$alkyl or an equivalent of a metal atom selected from Li, Na, K, ½Mg, ½Ca, ⅓Al;
$A_3$ is methylene;
$A_4$ is $C_1$-$C_8$alkylene;
$A_5$ is selected from —O—, —S—, —COO—, —OCO—, —NHCO—, —CONH—;
$A_6$ is selected from $C_4$-$C_{18}$alkylthio and $C_4$-$C_{18}$alkylamino;
$A_7$ is —NH—;
when n is 2, $R_1$ is $C_1$-$C_{12}$alkylene; $C_2$-$C_{20}$alkylene interrupted and/or end-capped with —O—, —S—, —COO—, —OCO—, —NHCO—, —CONH—, -$L_1$-; or $R_1$ is a divalent mono-, di- or tricycloalkylene group; or $R_1$ is —O—; —NH—; —S—;
when n is 3, $R_1$ is trivalent alkyl of 3 to 20 carbon atoms; said trivalent alkyl interrupted by —O—, —S—, —COO—, —OCO—, —NHCO—, —CONH—, phenylene, phenylene which is substituted by $C_1$-$C_{12}$alkyl; or $R_1$ is a trivalent group of one of the formulae

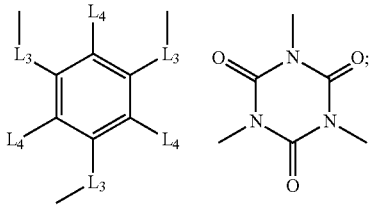

when n is 4, $R_1$ is tetravalent alkyl of 4 to 20 carbon atoms; or said tetravalent alkyl interrupted by —O—, —S—, —COO—, —OCO—, —NHCO—, —CONH—;
$L_1$ is a group of the formula

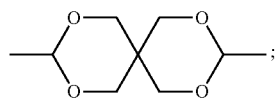

$L_3$ independently are $C_1$-$C_4$alkylene;
$L_4$ independently are H or $C_1$-$C_4$alkyl.

It is furthermore preferred that at least one of $R_2$ and $R_3$ is in o-position to the OH—group.

In particularly preferred phenolic antioxidants, each mono-hydroxyphenyl moiety contains one or preferably two aliphatic substituents, e.g. methyl, tert.-butyl, tert.-pentyl, at least one thereof being located in ortho-position relative to the phenolic OH.

For example, the phenolic antioxidant (b) is of the formula (A')

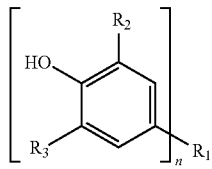

wherein
$R_2$ and $R_3$ independently are methyl, tert.-butyl, or methyl substituted by S-linear-$C_4$-$C_{12}$alkyl (e.g. $R_2$ and $R_3$ independently are methyl or tert.-butyl, especially tert-butyl);
n is 1, 2 or 4;
when n is 1,
$R_1$ is $C_4$-$C_{16}$alkyl interrupted by —S— or —COO— (e.g. $R_1$ is $C_4$-$C_{16}$alkyl interrupted by —COO—);
when n is 2, $R_1$ is $C_4$-$C_{16}$alkylene interrupted with —O—, —S—, —COO— and/or —OCO—(e.g. $C_4$-$C_{16}$alkylene interrupted with —S—, —COO— and/or —OCO—, preferably interrupted with —S— and —COO—);
when n is 4, $R_1$ is tetravalent alkyl of 5 to 20 carbon atoms interrupted by —COO— and/or —OCO—, preferably interrupted by —COO—.

Halogen means fluoro, chloro, bromo, or iodo, preferably chloro.

$C_1$-$C_{22}$-alkyl means, for example, methyl, ethyl, n-, i-propyl, n-, sec.-, iso-, tert.-butyl, n-pentyl, tert.-pentyl, n-hexyl, n-heptyl, n-octyl, tert.-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl.

$C_2$-$C_{20}$-alkenyl stands for e.g. ethenyl, n-, i-propenyl, n-, sec.-, iso-, tert.-butenyl, n-pentenyl, n-hexenyl, n-heptenyl, n-octenyl, n-nonenyl, n-decenyl, n-undecenyl, n-dodecenyl, n-tridecenyl, n-tetradecenyl, n-pentadecenyl, n-hexadecenyl, n-heptadecenyl, n-octadecenyl, n-nonadecenyl, n-eicosenyl, preferably $C_2$-$C_6$-alkyl such as ethenyl, n-, i-propenyl, n-, sec.-, iso-, tert.-butenyl, n-pentenyl, n-hexenyl.

$C_5$-$C_8$-cycloalkyl stands, for example, for cyclopentyl, cyclohexyl, cycloheptyl, or cyclooctyl, preferably cyclohexyl. Examples for di- or tricycloalkyl groups are bicycloheptyl or

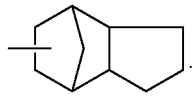

Di-, tri- or tetravalent residues may be derived from the corresponding monovalent units, e.g. those listed above, by abstraction of 1, 2 or 3 further hydrogen atoms.

$C_1$-$C_6$-alkoxy stands for e.g. methoxy, ethoxy, n-, i-propoxy, n-, sec.-, iso-, tert.-butoxy, n-pentoxy, n-hexoxy.

$C_2$-$C_{12}$alkanoyloxy includes, for example acetyloxy, propionyloxy; $C_3$-$C_{12}$alkenoyloxy includes acryloyloxy, methacryloyloxy.

Phenolic antioxidants (b) useful in the present invention include the compounds listed below:

(101)

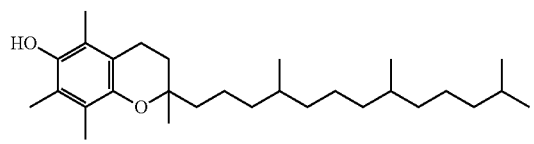

(102)

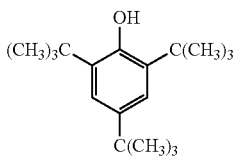

(103)

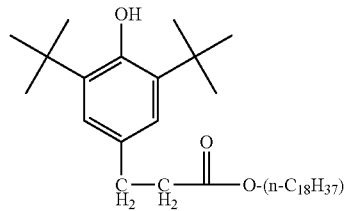

Irganox 1076

(104)

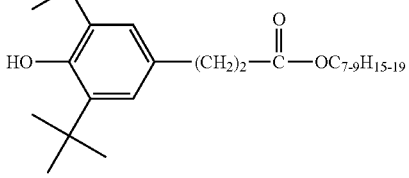

-continued
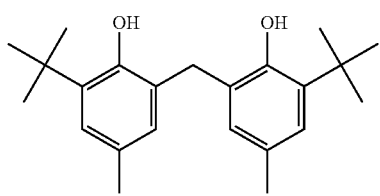 (105)
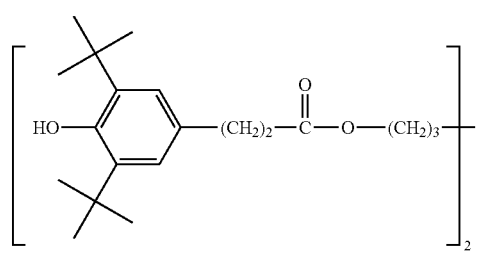 (106)
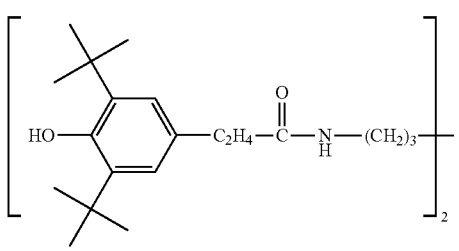 (107)
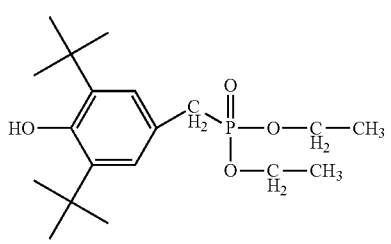 (108)
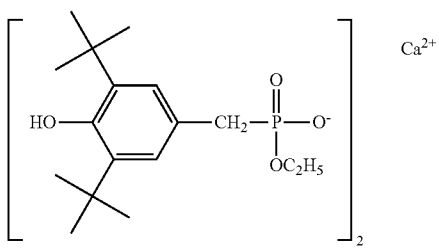 (109)
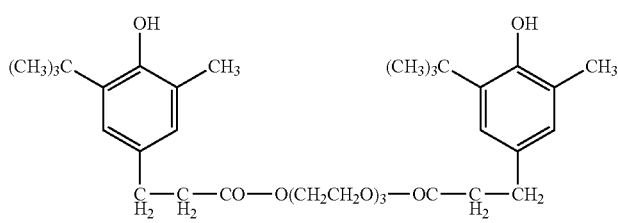 (110)
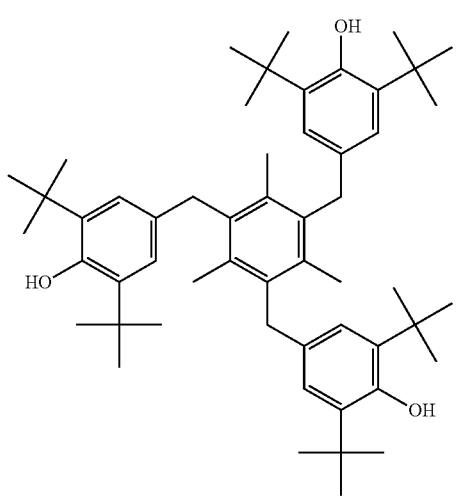 (111)

-continued
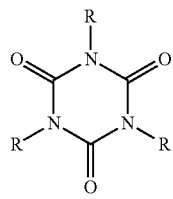 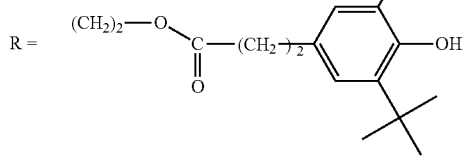 (112)
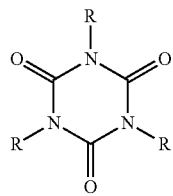 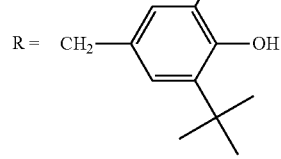 (113)
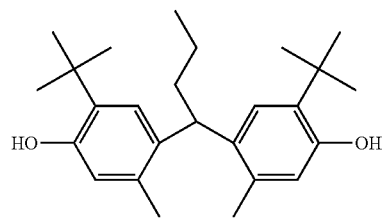 (114)
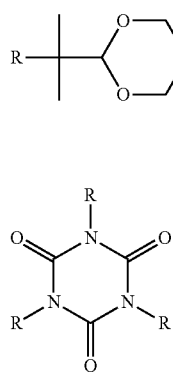 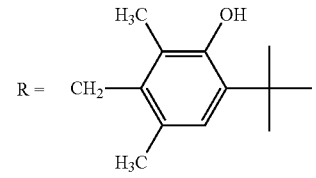 (115)
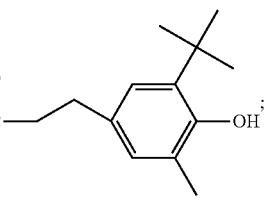 (116)
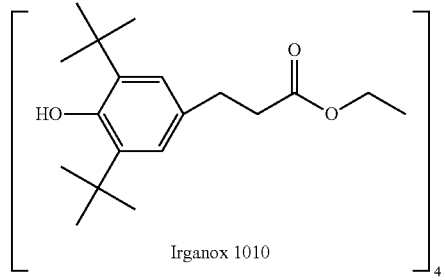 (117)
Irganox 1010
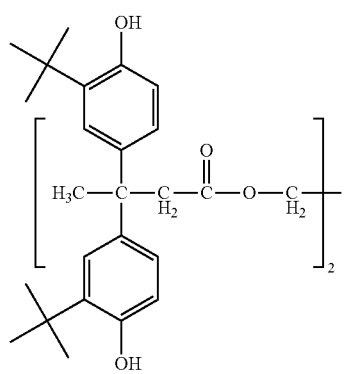 (118)
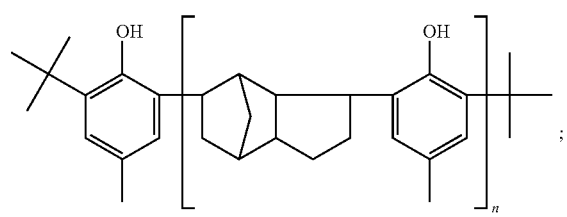 (119)
where n is 2 or 3
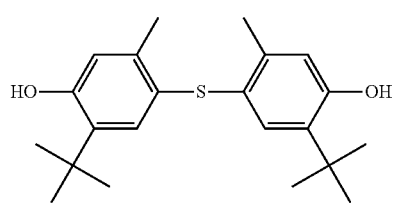 (120)
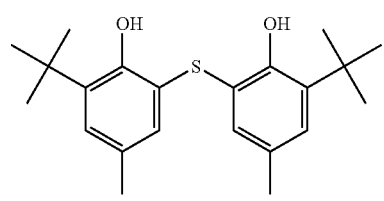 (121)

(121) 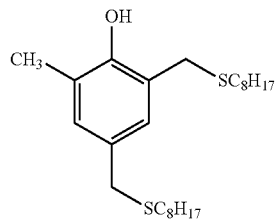
(122) 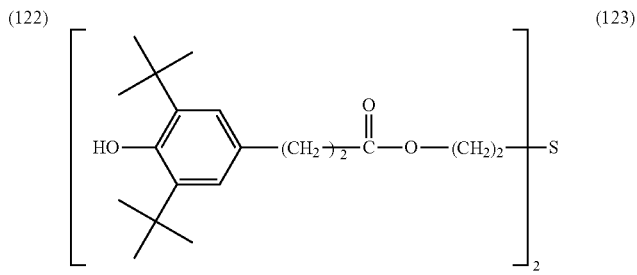
(123) 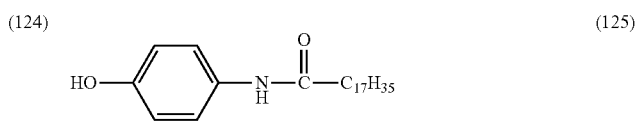
(124) 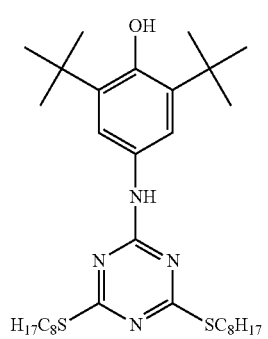
(125) 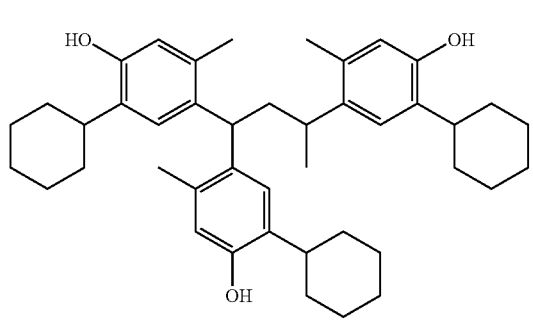
(126) 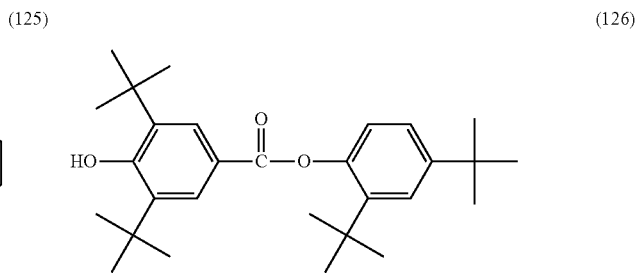
(127) 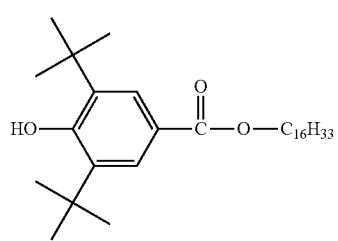
(128) 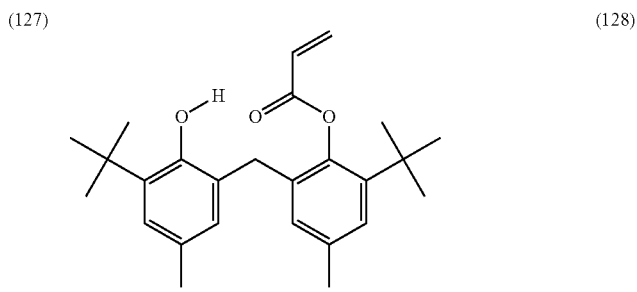
(129) 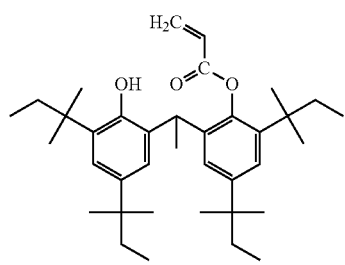
(130) 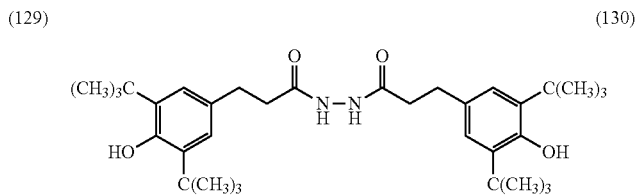

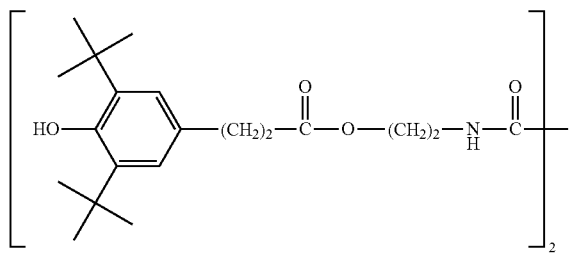
(131)

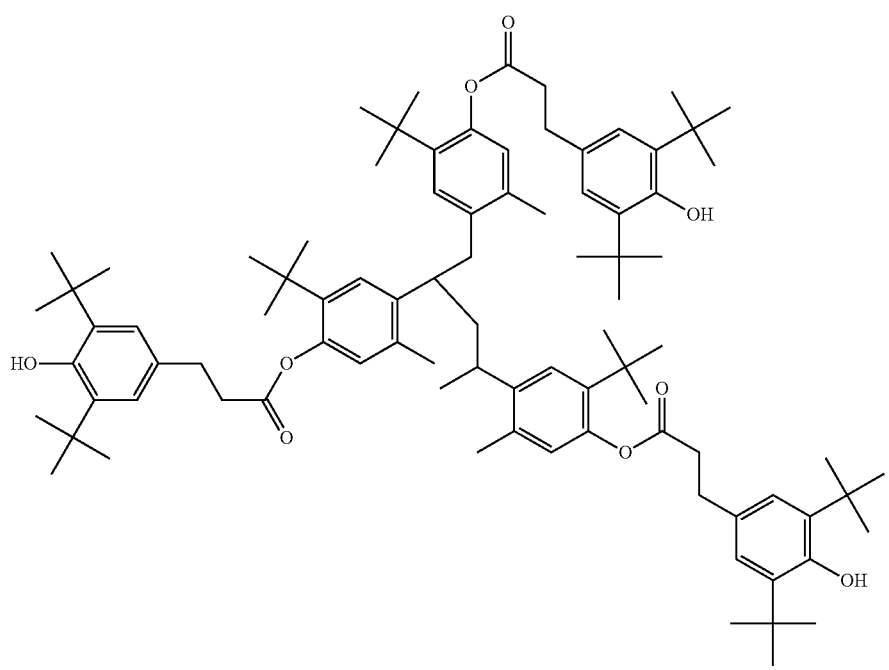
(132)

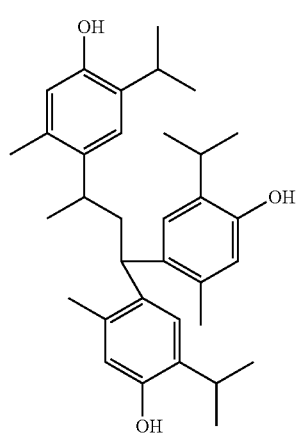
(133)

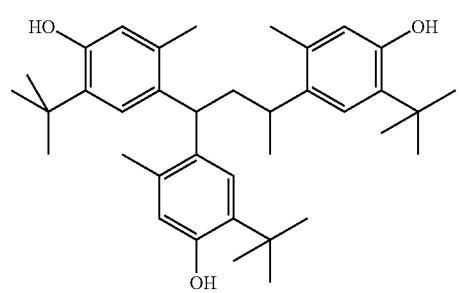
(134)

Especially suitable as phenolic antioxidants (b) are compounds of formula (103), (110), (117), (122) or (123).

For instance, the phenolic antioxidants (b) are commercially available or can be prepared according to a method known in the art.

Another aspect of this invention is a process for the preparation of a concentrated aqueous polymer dispersion with an average particle size of less than 1000 nm comprising the step of polymerizing at least one ethylenically unsaturated monomer in the presence of a non-polar organic phenolic antioxidant and a non-ionic, cationic or anionic surfactant (preferably a non-ionic or anionic surfactant) by heterophase radical polymerization;

wherein the weight ratio of non-polar organic phenolic antioxidant to polymer carrier formed from the ethylenically unsaturated monomer is equal to or greater than 30 parts of phenolic antioxidant per 100 parts of polymer carrier and for instance, the residual monomer content of the polymer carrier after the polymerisation is below 2000 ppm.

For instance, the process comprises the steps
a) dissolving, emulsifying or dispersing a non-polar organic phenolic antioxidant in at least one ethylenically unsaturated monomer;
b) preparing a conventional oil in water emulsion of said phenolic antioxidant dissolved, emulsified or dispersed in at least one ethylenically unsaturated monomer in the presence of a non-ionic, cationic or anionic surfactant;
c) homogenizing the conventional emulsion to a miniemulsion wherein the droplets of the organic phase have an average diameter below 1000 nm;
d) polymerizing the miniemulsion by adding a polymerization initiator.

For instance, the product of the heterophase polymerisation process has a solids content of at least 20%, preferably at least 30%, most preferably at least 35%. For example, the product of the heterophase polymerisation process has a solids content of up to 90%.

Typically, the particle size distribution of the small droplets of ethylenically unsaturated monomer and phenolic antioxidants does not substantially change during polymerisation.

Optionally other water miscible solvents may be present usually 0.01-100%, especially 5-100% by weight based on the phenolic antioxidant content. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, glycerol, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof.

For instance, depending on the intended and application the water miscible solvent remains in the product form or is removed after the polymerisation by e.g. vacuum distillation.

Preferred are water, water alcohol mixtures, water ethylene glycol or propylene glycol mixtures, water acetone, water tetrahydrofurane, water glycerol or water dimethylformamide mixtures, especially water, in particular water without an organic solvent, such as water without a water-miscible solvent.

In a special process variant, a preformed polymer is added to phenolic antioxidant and monomer in process step a, b and/or c. This polymer may preferably be soluble in the monomer and may support the process steps a, b and/or c, i.e. may support the formation of a nanodisperse emulsion of AO and monomer in water.

Suitable surfactants or surface active compounds, which may be added are known in the art. The amounts typically used range from 0.01% by weight to 10% by weight, based on the monomer or monomers.

Examples for anionic surfactants are alkali and ammonium salts of sulphonic acid (e.g. $C_{12}$-$C_{18}$alkylsulfonic acid), dialkyl esters of succinic acid or sulfuric acid halfesters of ethoxylated alkanoles, especially poly(oxy-1,2-ethanediyl), α-sulfo-o-hydroxy-, C12-14-alkyl ethers, sodium salts (CAS no. 68891-38-3). Some compounds are known for example from U.S. Pat. No. 4,269,749 and largely items of commerce, such as under the trade name Dowfax® 2A1 (Dow Chemical Company).

Nonionic surfactants are for example aliphatic or araliphatic compounds such as ethoxylated phenols (mon, di, tri) with an ethoxylation degree of 3 to 50 and alkyl groups in the range from $C_4$-$C_9$, ethoxylated long chain alcohols or polyethyleneoxide/polypropyleneoxide block copolymers.

Furthermore protective colloids such as polyvinylalcohols, starch, cellulose derivatives or copolymers containing vinylpyrrolidone may be added to form a conventional oil in water emulsion according to step b). Further examples are given in "Houben-Weyl, Methoden der Organischen Chemie, Band XIV/1, Makromolekulare Stoffe, G. Thieme Verlag Stuttgart 1961, 411-420".

The homogenization step b) and c) is usually carried out by applying mechanical agitation (rotor/stator disperser) or/and followed by using high force dispersion devices like for example a ultrasonic sound equipment (J. Dispersion Sci. Technology 2002, 23(1-3), 333-349) or a high pressure homogenizer (APV Gaulin homogenizer; Microfluidizer). The emulsification/homogenization can be carried out continuously or batchwise. Apparatus for this purpose are known in the art. This is for example described in U.S. Pat. No. 5,108,654.

The polymerization step d) is usually carried out by adding a free radical polymerization initiator.

Preferably the free radical initiator is present in an amount of from 0.01 weight-% to 20 weight-%, more preferably from 0.1 weight-% to 10 weight-% and most preferably from 0.2 weight-% to 5 weight-%, based on the monomer or monomer mixture.

The polymerization initiator may be added batchwise or continuously to the reaction mixture.

Preferably the free radical initiator of component b) is a redox initiator system or a photoinitiator, especially a bis-azo compound, a peroxide or a hydroperoxide, especially a hydroperoxide.

Specific preferred radical sources are 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis(t-butylperoxy) butane, 2,2 bis(t-butylperoxy) propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl)benzene, 3,5-bis(t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide, particularly preferred is t-butyl hydroperoxide.

It is also possible to use combinations of Fe-compounds or Co-compounds with peroxo salts or salts of bisulfites or hydrosulfites. These combinations are known as redox systems.

The polymerization temperature depends on the initiator used. Usually the polymerization temperature is in the range of 5° C. to 95° C. and preferably from 30° C. to 90°. If pressure is applied the temperature can raise up to 120° C., however, polymerization under normal pressure is the usual process.

Alternatively the polymerization can be initiated by photoinitiators and electromagnetic radiation, in particular actinic radiation.

Photoinitiators suitable for use in the process according to the invention are in principle any compounds and mixtures that form one or more free radicals when irradiated with electromagnetic waves. These include initiator systems consisting of a plurality of initiators and systems that function independently of one another or synergistically. In addition to coinitiators, for example amines, thiols, borates, enolates, phosphines, carboxylates and imidazoles, it is also possible to use sensitisers, for example acridines, xanthenes, thiazenes, coumarins, thioxanthones, triazines and dyes. A description of such compounds and initiator systems can be found e.g. in Crivello J. V., Dietliker K. K., (1999): Chemistry & Technology of UV & EB Formulation for Coatings, Inks & Paints, and in Bradley G. (ed.) Vol. 3: Photoinitiators for Free Radical and Cationic Polymerisation 2nd Edition, John Wiley & Son Ltd. The photoinitiator suitable for the process according to the invention in step b) may be either an initiator having an unsaturated group or an initiator not having such a group Such compounds and derivatives are derived, for example, from the following classes of compounds: benzoins, benzil ketals, acetophenones, hydroxyalkylphenones, aminoalkylphenones, acylphosphine oxides, acylphosphine sulfides, acyloxyiminoketones, alkylamino-substituted ketones, such as Michler's ketone, peroxy compounds, dinitrile compounds, halogenated acetophenones, phenylglyoxylates, dimeric phenylglyoxalates, benzophenones, oximes and oxime esters, thioxanthones, coumarins, ferrocenes, titanocenes, onium salts, sulfonium salts, iodonium salts, diazonium salts, borates, triazines, bisimidazoles, polysilanes and dyes. It is also possible to use combinations of the compounds from the mentioned classes of compounds with one another and combinations with corresponding coinitiator systems and/or sensitisers.

The polymerisation initiator can also be one of the group of thermally reacting water soluble or oil soluble initiators such as persulfates (e.g. ammonium or potassium salt thereof) or hydrochloride salts of diazo compounds such as 2,2'-azobis (2-(2-imidazolin-2-yl)propane)dihydrochloride, CAS 27776-21-2, for introduction into the water phase before or after the preparation of the miniemulsion. Oil soluble peroxides such as dilauroyl peroxide, dicetyl proxydicarbonate, tert-amyl peroxyneodecanoate, tert-amyl peroxypivalate and tert-butyl peroxy-2-ethylhexanoate, as well as AIBN are dissolved in the monomer phase prior to the preparation of the miniemulsion.

It can be a variation of the invention, if both water (redox or thermal) and oil soluble initiators are combined in the same polymerization process, in this case radicals are generated inside the emulsion droplets and in the water phase simultaneously or consecutively depending on the profile of the reaction temperatures.

The final aqueous product form might be stabilized with a biocide against fungal, bacterial or algae growth, for instance, with biocidically active amount of commerically available products containing CIT, MIT, BIT, phenoxyethanol, 4-hydroxybenzoic alkyl esters (Nipagin), phenonip or combinations thereof.

Surprisingly it has been found that after polymerization has been completed, the volatile components, water mainly, can be removed without agglomeration of the particles. The polymer particles can therefore readily be re-dispersed, if desired.

Vaporization of the volatile components can be carried out using standard methods, such as for example spray drying or freeze-drying.

Another aspect of the invention is a polymer powder obtainable (e.g. obtained) by vaporizing the volatile components of the concentrated aqueous polymer dispersion as defined herein.

This polymer powder is mainly obtainable if the carrier polymer and the phenolic anti-oxidant are solid at room temperature.

The polymer powder containing highly concentrated phenolic antioxidants can be used for example in the formulation of an aqueous composition (such as a redispersible powder), a solvent-based composition, a solvent free composition or a powder coating or for plastic applications in mold, blow mold or extrusion processes, especially for use in coatings, inks or adhesives.

Another aspect of the present invention is a composition stabilized against thermal, oxidative or light-induced degradation which comprises,
(a) an organic material susceptible to thermal, oxidative or light induced degradation, and
(b) a concentrated aqueous polymer dispersion as defined herein.

For instance, the amount of component b) is from 0.1 to 40%, preferably 0.1 to 20%, more preferably 0.1 to 10%, most preferably 0.1 to 5%, by weight based on the weight of the component a) (i.e. organic material to be stabilised).

For very thin film applications the amount of component b) may be as high as 60% by weight based on the weight of component a).

For instance, the organic material a) is a binder polymer selected from the group consisting of polyolefins, polyester and alkyd resin emulsions, polyvinylacetate, silicone resin emulsions, polyurethanes, acrylic emulsions and suspension PVC. Some examples of such binder polymers are aqueous poly(meth)acrylate dispersions, PUDs (polyurethane dispersions), polyesters, ethylene-vinylacetate dispersions, vinylacrylic dispersions, alkyd emulsions, styrene/acrylate dispersions, aq. solution polymers of before mentioned polymers, all kinds of physical & chemical mixtures of the binder polymers mentioned before; e.g. wb 2k PUR-acrylic dispersions including blocked polyisocyanates, acrylic melamine stoving enamels, especially preferred is polyacrylate.

For instance, the organic material is a recording material. Preferably, the recording material is a photographic material or an ink jet material. Preferably, the recording material is a printed material containing the concentrated aqueous polymer dispersion in an overprint varnish. The recording material can be such as described in WO2005/023878, page 54, line 11 to page 58, line 20.

For example, the organic material is an adhesive (especially an aqueous adhesive), an aqueous emulsion of a natural or synthetic rubber, a water based ink or a water based coating. Preferably, the organic material is a water based coating, especially a water based acrylic coating.

Adhesives are preferably selected from the group consisting of polyurethanes, polyacrylics, epoxys, phenolics, polyimides, poly(vinyl butyral), polycyanoacrylates, polyacrylates, ethylene/acrylic acid copolymers and their salts (ionomers), silicon polymers, poly(ethylene/vinyl acetate), atatic polypropylene, styrene-diene copolymers, polyamides, hydroxyl-terminated polybutadiene, polychloroprene, poly(vinyl acetate), carboxylated styrene/butadiene copolymers and poly(vinyl alcohol).

Aqueous emulsions of natural or synthetic rubber, are for example natural latex or lattices of carboxylated styrene/butadiene copolymers.

The concentrated aqueous polymer dispersions can also be employed in inks, preferably for ink jet printing.

When water-soluble, water miscible or water dispersible coatings are desired ammonium salts of acid groups are present in the resin backbone.

The coatings can be physically drying systems or crosslinked polymers. For example crosslinked polymers are derived from aldehydes on the one hand and phenols, ureas and melamines on the other hand, such as phenol/formaldehyde resins, urea/formaldehyde resins and melamine/formaldehyde resins.

Drying and non-drying alkyd resins are also possible.

Unsaturated polyester resins derived from copolyesters of saturated and unsaturated dicarboxylic acids with polyhydric alcohols and vinyl compounds as crosslinking agents, and also halogen-containing modifications thereof of low flammability can be used.

Preferred are crosslinkable acrylic resins derived from substituted acrylates, for example epoxy acrylates, urethane acrylates or polyester acrylates.

Alkyd resins, polyester resins and acrylate resins crosslinked with melamine resins, urea resins, polyisocyanates or epoxy resins.

Also crosslinked epoxy resins derived from polyepoxides can be formulated, for example from bisglycidyl ethers or from cycloaliphatic diepoxides.

The alkyd resin lacquers are the conventional stoving lacquers which are used in particular for coating automobiles (automobile finishing lacquers), for example lacquers based on alkyd/melamine resins and alkyd/acrylic/melamine resins (see H. Wagner and H. F. Sarx, "Lackkunstharze" (1977), pages 99-123). Other crosslinking agents include glycouril resins, blocked isocyanates or epoxy resins.

The lacquers are suitable both for metal finish coatings and solid shade finishes, especially in the case of retouching finishes, as well as various coil coating applications. The lacquers stabilized in accordance with the invention are preferably applied in the conventional manner by two methods, either by the single-coat method or by the two-coat method. In the latter method, the pigment-containing base coat is applied first and then a covering coat of clear lacquer over it.

The coatings may also be applied onto wood substrates to prevent the wood from discoloration.

Aqueous coating materials can be based on water-soluble, water-thinnable polymers or polymer dispersions. Highly polar organic film formers, such as polyvinyl alcohols, polyacrylamides, polyethylene glycols, cellulose derivatives, acrylates and polyesters with very high acid value are examples for water-soluble polymers. Water-thinnable film formers consist of relatively short-chain polymers with acid or basic groups capable of salt formation incorporated into the side chains. They are neutralized with suitable bases or acids, which evaporates during film formation leads to insoluble polymers. Examples thereof are short and medium oil carboxylic acid alkyd resins, water-thinnable melamine resins, emulsifiable epoxy resins or silicone-based emulsions. Several polymer types are used as water-dilutable film formers. Most important of these are vinyl acetate copolymers with dibutyl maleinates, vinyl esters of Versatic acids, acrylic ester acids or terpolymers with ethylene and vinyl chloride, vinyl propionates, pure acrylates consisting of polyacrylates and polymethacrylates, acrylate copolymers with styrene and styrene-butadiene copolymers.

The coating material may also be a water-borne radiation-curable formulation of photo-polymerisable compounds.

The coating material may also contain further ingredients such as pigments or dyes, fillers, solvents as coalescing agent, accelerators (hardeners) for the binders, waxes or other hydrophobing agents, defoaming agents, levelling agent, wetting agent, rheological additives (thickeners or thixotropic agents), amines or bases for pH adjustment, photoinitiators, biocides, preservatives, fungicides or insecticides.

The coating material may be dried physically or cured chemically at room temperature, by stoving or by radiation. Provided the binders are curable binders, they are normally used together with the hardener and/or accelerator.

Any coating composition suitable for coating of wood or wood-based material may be used as aqueous wood coating material. Examples for wood or wood based material are furniture, parquet, window frames, panels, doors, wood core plywood, chipboard and fibreboard. Depending on their function or transparency the wood coating materials can be primers/impregnating stains, stain blocking primers and exterior topcoats like woodstains and opaque coatings. Preferable binders are nowadays straight acrylic dispersions, in many cases self-crosslinking acrylic dispersions or alkyd resin emulsions or hybrid coatings as mixtures thereof. For interior applications such as furniture and parquet water-based lacquers based on mostly self-crosslinking acrylic dispersions, polyurethane dispersions, acrylic polyurethane copolymer dispersions are preferably used. When film properties should fulfill high requirements, radiation-curable polymer dispersions or two pack systems consisting of hydroxyl-functional polymer dispersion and water-dispersible polyisocyanates are preferred.

The aqueous wood coating material can be applied to the wood by conventional techniques, for example by impregnating, spreading, brushing, dipping, deluging, spraying or with roller or curtain machines. Also impregnating under high pressure or under vacuum is possible.

An object of the present invention is a powder coating composition stabilized against thermal, oxidative or light-induced degradation comprising
a) a solid binder material; and
b) a polymer powder as defined herein.

By "powder coating compositions" or "powder coatings" is meant the definition as described in "Ullmann's Encyclopedia of Industrial Chemistry, 5th, Completely Revised Edition, Vol. A 18", pages 438 to 444 (1991) in Section 3.4. By powder coatings are meant thermoplastic or bakable, crosslinkable polymers, which are applied in powder form to predominantly metallic substrates. The way in which the powder is brought into contact with the workpiece that is to be coated typifies the various application techniques, such as electrostatic powder spraying, electrostatic fluidized-bed sintering, fixed bed sintering, fluidized-bed sintering, rotational sintering or centrifugal sintering. Preferred organic filmforming binders for the powder coating compositions of the invention are stoving systems based, for example, on epoxy resins, polyester-hydroxyalkylamides, polyester-glycolurils, epoxy-polyester resins, polyester-triglycidyl isocyanurates, hydroxy-functional polyester-blocked polyisocyanates, hydroxy-functional polyester-uretdiones, acrylate resins with hardener, or mixtures of such resins.

Polyesters are in general hydroxy- or carboxy-functional and are normally prepared by condensation of diols and dicarboxylic acids. By adding polyols and/or polyacids, branched polyesters are obtained which then give rise, in the course of baking in the presence of crosslinkers, to network structures which give the coating the desired physical properties, such as scratch resistance, impact strength and flexural strength. Instead of multifunctional acids it is also possible to use anhydrides or acid chlorides, such as maleic anhydride, itaconic anhydride, phthalic anhydride, terephthalic anhydride, hexahydroterephthalic anhydride, trimellitic anhydride, pyromellitic dianhydride, succinic anhydride, etc. It is also possible to use simple esters such as dimethyl terephthalate for example, in which case the polymerization proceeds by transesterification with elimination of the volatile alcohol. Likewise practicable is a preparation by a combination of transesterification and condensation. Polyesters can be prepared, furthermore, by polycondensation of hydroxycarboxylic acids such as 12-hydroxystearic acid and hydroxypivalic acid, or of the corresponding lactones, such as ε-caprolactone, for example. Examples of dicarboxylic acids and polyacids include terephthalic, isophthalic, adipic, azelaic, sebacic, 1,12-dodecanedioic, pyromellitic, 3,6-dichlorophthalic, succinic, 1,3-cyclohexanedicarboxylic and 1,4-cyclohexanedicarboxylic acids. Examples of diols and polyols include ethylene glycol, propylene glycol, glycerol, hexanetriol, hexane-2,5-diol, hexane-1,6-diol, pentaerythritol, sorbitol, neopentyl glycol, trimethylolethane, trimethylolpropane, tris-1,4-cyclohexanedimethanol, trimethylpentanediol, 2,2-diethyl-1,3-propanediol, 2-methyl-2-butyl-1,3-propanediol, esterdiol 204 (ester of hydroxypivalic acid and neopentyl glycol), hydrogenated bisphenol A, bisphenol A, hydroxypivalic acid, hydroxypivalate esters, 2-butyl-2-ethyl-1,3-propanediol, 1,4-butanediol, 2-butene-1,4-diol, 2-butyne-1,4-diol or 2-methyl-1,3-propanediol.

Suitable crosslinking agents for carboxy-functional polyesters are epoxy compounds such as Novolac®-epoxy resins, diglycidyl ethers of bisphenol A, hydrogenated bisphenol A and bisphenol A modified by reaction with, for example, aliphatic dicarboxylic acids. Also suitable are reactive epoxy compounds, such as triglycidyltriazolidine-3,5-dione, the glycidyl esters of polyacids, such as diglycidyl terephthalate and diglycidyl hexahydroterephthalate, hydantoin epoxides (U.S. Pat. No. 4,402,983) and, especially, triglycidyl isocyanurate, epoxidized unsaturated fatty acid esters (for example Uranox® from DSM) and Araldit®PT 910. Further crosslinking agents for carboxy-functional polyesters are β-hydroxyalkylamides (U.S. Pat. No. 4,076,917), such as the predominantly tetrafunctional β-hydroxyalkylamide derivative of adipic acid (Primid® XL552 from Rohm & Haas), for example. Derivatives of melamine, benzoguanimine and glycoluril that have been alkylated with low molecular mass alcohols have also proved suitable. Examples are tetra-methylmethoxyglycoluril (Powderlink® 1174 from American Cyanamid). In addition, bis- and trisoxazolidines, such as 1,4-bisoxazolidinobenzene, for example, are also known as crosslinking agents.

More recent are carboxy-functional polyester, which contain chemically bonded epoxy groups and are thus able to crosslink with themselves (Molhoek et al., 22nd Fatipec Congress, 15-19.5.95, Budapest, Vol. 1, 119-132).

In all systems in which an epoxy group or a glycidyl radical reacts with a carboxyl group or with an anhydride in a crosslinking reaction, it is possible to employ catalysts. Examples are amines or metal compounds such as aluminium acetylacetonate or tin octoate, for example.

The polyisocyanate crosslinkers are of particular importance as crosslinking agents for hydroxy-functional polyesters. In order to prevent premature crosslinking, because of the high reactivity of isocyanates, and to obtain good levelling of the melted powder, the polyisocyanates are blocked (internally in the form of a uretdione, or as an adduct with a blocking agent). Blocking agents most commonly employed are ε-caprolactam, methyl ethyl ketoxime or butanone oxime. Other suitable blocking agents for isocyanates are described in the publications by G. B. Guise, G. N. Freeland and G. C. Smith, J. Applied Polymer Science, 23, 353 (1979) and by M. Bock and H.-U. Maier-Westhues in "Progress in Product Development for Powder Coating Technology, XIX th Int. Conf. on Organic Coatings, Science and Technol., Athens, 12-16 July", 1993. Examples of blocked and unblocked polyisocyanates include 2-methylpentane 1,5-diisocyanate, 2-ethylbutane 1,4-diisocyanate, 3(4)-isocyanatomethyl-1-methylcyclohexyl isocyanate, 3-isocyanatomethyl-3,5,5-trimethylcyclohexane diisocyanate, tris(isocyanatomethyl)benzene, 4,4'-diisocyanatodicyclohexylmethane, 1,4-bis(isocyanatomethyl)cyclohexane, m-tetramethylxylene diisocyanate, p-tetramethylxylene diisocyanate and, in particular, isophorone diisocyanate. For deblocking it is common to add a metallic catalyst, such as tin octoate, dibutyltin oxide or dibutyltin dilaurate, for example, to the polyisocyanate formulation.

Further suitable crosslinking agents for hydroxy-functional polyesters are anhydrides such as trimellitic anhydride and its reaction products with diols and diamines. Further examples of such crosslinking agents are described by T. A. Misev in "Powder Coatings: Chemistry and Technology", published by J. Wiley & Sons, Chichester on pages 123 and 124.

Polyacrylates, which commonly possess hydroxyl, carboxyl or glycidyl functionality, are also employed as binders for powder coatings. They are prepared by the customary methods, principally from monomers such as styrene and linear or branched $C_1$-$C_8$alkyl esters of acrylic or methacrylic acid. In addition, other ethylenically unsaturated compounds, such as divinylbenzene, acrylamide, methacrylamide, butoxymethylacrylamide, acrylonitrile, butadiene, etc., can be added and copolymerized. Hydroxyl functionality is ensured by the copolymerization of hydroxy-functional monomers such as hydroxyethyl acrylate, hydroxyethyl methacrylate, hydroxypropyl acrylate, hydroxypropyl methacrylate, for example. For carboxyl functionality use is made of ethylenically unsaturated acids and anhydrides, such as acrylic, methacrylic, itaconic and crotonic acid, and maleic, itaconic, acrylic or methacrylic anhydrides (U.S. Pat. No. 3,836,604). Glycidyl functionality is provided, as taught in EP-A-0 256 369 and U.S. Pat. No. 3,876,578, by the copolymerization of monomers such as glycidyl acrylate and glycidyl methacrylate. As crosslinking agents for polyacrylates with hydroxyl or carboxyl functionality it is possible in principle to use the same compounds as already described for the polyesters with hydroxyl or carboxyl functionality. Further suitable crosslinking agents are the epoxy compounds of U.S. Pat. No. 0,045,040. Suitable crosslinking agents for polyacrylates with glycidyl functionality are dicarboxylic acids, such as sebacic acid and 1,12-dodecanedicarboxylic acid, and anhydrides, such as bistrimellitic anhydride, for example, and the compounds described in U.S. Pat. No. 3,880,946. DE-A-3 310 545, furthermore, discloses self-crosslinking polyacrylates.

Epoxy resins for powder coatings are usually either Novolac®-epoxy resins or, in particular, those based on aromatic polyols, especially those based on bisphenols such as bisphenol A. Also known are modified bisphenol epoxy resins, from JP-A-58 187 464 (1982). The epoxy resins are employed in combination with crosslinkers from the classes of the solid aliphatic amines, solid aromatic amines, amine adducts, phenolic resins, polyacids and the already described carboxy-functional polyesters. Hardeners deserving of very special mention are the dicyandiamides, which are frequently employed together with a catalyst, examples of which are Lewis acids, boron trifluoride-amine complexes, metal complexes, tertiary or quaternary amines, and imidazoline derivatives, such as 2-methylimidazoline.

Preferred is a composition stabilized against thermal, oxidative or light-induced degradation comprising
a) a thermoplastic polymer and
b) a polymer powder as described herein.

Thermoplastic polymers are for example polyolefins, polyester, polyamide, polystyrene or polycarbonate.

For instance, a composition as defined herein additionally comprises a further additive.

For example, further additives are sterically hindered amine stabilizers, UV-absorbers, phosphites, phosphonites, benzofuranones, indolinones, metal stearates, metal oxides, pigments, dyes, organophosphorus compounds, hydroxylamines, metal deactivators, nitrones, thiosynergists, peroxide scavengers, nucleating agents, fillers, reinforcing agents, plasticisers, lubricants, emulsifiers, rheology additives, catalysts, flow-control agents, optical brighteners, antistatic agents, blowing agents, biocides, slip- and leveling agents, wetting agents, dispersants, defoamers, matting agents, waxes, anti skinning additives, adhesion promoters, coalescents, rheology modifiers, sag control agents, thixotropic agents, flame retardants or mixtures thereof.

Examples of such further additives are given in WO2008/000646, page 36, line 9 to page 43, line 4.

For instance, the further additives are encapsulated in polymeric particles as described in WO2005/023878, WO2007/104713, WO2007/147726 and US2008/0146448 or the further additives are effect substances encapsulated in polymeric particles as described therein.

For example, the amount of further additives is from 0.1 to 40%, preferably 0.1 to 20%, more preferably 0.1 to 10%, most preferably 0.1 to 5%, by weight based on the weight of the component a) (i.e. organic material to be stabilised or solid binder material).

Another object of the present invention is the use of a concentrated aqueous polymer dispersion as defined herein as stabilizer against thermal, oxidative or light-induced degradation of organic materials, which are susceptible to thermal, oxidative or light induced degradation.

Of interest is a method for the stabilization of an organic material against thermal, oxidative or light-induced degradation, which comprises admixing and/or applying to said material as stabiliser a concentrated aqueous polymer dispersion as described herein.

Another object of the present invention is the use of a polymer powder as defined herein as stabilizer against thermal, oxidative or light-induced degradation of a powder coating.

Of interest is a method for the stabilization of a powder coating against thermal, oxidative or light-induced degradation, which comprises admixing and/or applying to the powder coating composition (e.g. the powder coating) as stabiliser a polymer powder as described herein.

Parts and % are usually parts by weight and wt.-% unless otherwise stated.

The preferences outlined herein apply to all aspects of the invention.

EXAMPLES

Synthesis of Concentrated Aqueous Product Forms of AO Via Miniemulsion Polymerization Dynamic light scattering (DLS, 90° scattering angle, Nicomp Model 380, Particle Sizing System, Santa Barbara, Calif., USA) is used to determine the mean intensity diameter ($D_{INT}$).

Water-borne product forms of the following hydrophobic antioxidants are synthesized:

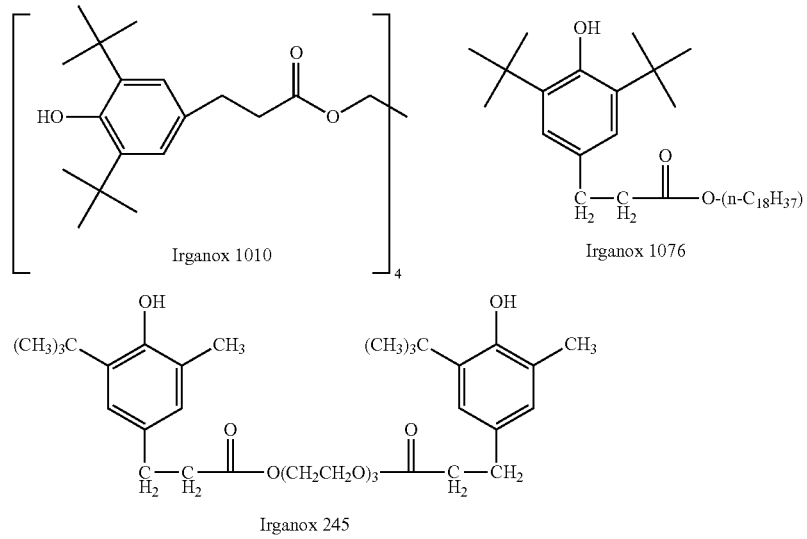

Irganox 1010

Irganox 1076

Irganox 245

-continued

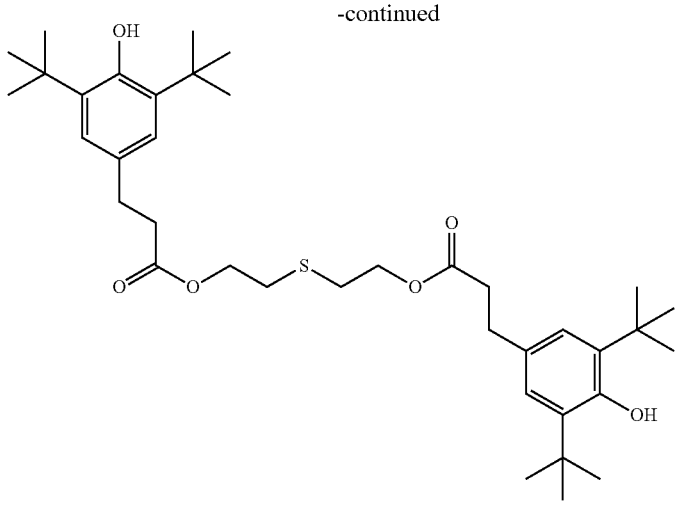

Irganox 1035

Quantification of Methyl Methacrylate (MMA) by HS-GC-MS analysis

Parameters of analysis: the residual monomer content of the samples is determined by headspace-GC-MS. The MS-parameters are set at: single ion Modus; m/z=100.00 (Target), 68.95, 85.00, 99.00 (qualifiers) for MMA quantification.

The headspace is done at 90° C. and samples are taken at defined time intervals to ensure that the equilibrium time between the gas phase and the liquid phase is reached, and that all the monomer is released into the gas phase. The consistency is checked by taking samples after 30, 60 and 90 min at 90° C.

Example 1

Synthesis of Encapsulated Irganox 245

80.0 g of Irganox 245 is dissolved in 68.4 g of methyl methacrylate (MMA), 6.08 g of stearyl methacrylate (SMA), 0.23 g of 1,4-butanediol diacrylate and 1.52 g of methacrylic acid at 40° C. to a homogeneous solution. This oil phase is added slowly to a stirred solution of 20.13 g poly(oxy-1,2-ethanediyl), α-sulfo-o-hydroxy-, $C_{12}$-$C_{14}$-alkyl ethers, sodium salts (CAS no. 68891-38-3, 31 wt % active, 69 wt % water, Cognis Deutschland GmbH&Co. KG) in 202 g of deionised water. After stirring for 30 min and 20 min of ultrasound treatment (Bandelin Sonoplus, Generator GM 2200, 200 W, 20 kHz, 60% power) a kinetic stable emulsion of an average droplet size of 200 nm and a viscosity of 40 mPas is obtained.

The emulsion is heated up to 40° C. and t-butyl hydroperoxide (0.51 g, 70% in $H_2O$) dissolved in 5 g of deionised water is added.

The emulsion is continuously stirred at 40° C. by a mechanical stirrer, while a solution of 0.76 g of sodium hydroxymethanesulfinate dissolved in 15 g of water is prepared. A portion of 30% of this solution is added at once, leading to an exotherm to 43° C. after 20 min. At this point, the remainder redox solution is added over a period of 1 hour maintaining the internal temperature at 40° C.

After addition, the reaction mixture is subsequently stirred at 60° C. for one hour, then cooled to RT. The pH of the dispersion is adjusted to 8.8 by addition of amine (0.7 g of AMP90 (2-amino-2-methyl-1-propanol, CAS no. 124-68-5 (90% conc in water)) and filtered via a 20 μm filter. The resulting milky dispersion has a particle size $D_{INT}$ of 82 nm (dynamic light scattering DLS). The final active content of the dispersion is 20 wt % of Irganox 245, the solid content is 41.6 wt % and the isolated yield is ca. 380 g.

Example 2

Synthesis of Encapsulated Irganox 1010

60.0 g of Irganox 1010 is dissolved in 51.3 g of methyl methacrylate (MMA), 4.56 g of stearyl methacrylate (SMA), 0.17 g of 1,4-butanediol diacrylate and 1.14 g of methacrylic acid at 40° C. to a homogeneous solution. This oil phase is added slowly to a stirred solution of 15.1 g poly(oxy-1,2-ethanediyl), α-sulfo-o-hydroxy-, $C_{12}$-$C_{14}$-alkyl ethers, sodium salts (CAS no. 68891-38-3, 31 wt % active, 69 wt % water, Cognis Deutschland GmbH&Co. KG) in 147 g of deionised water. After stirring for 30 min and 20 min of ultrasound treatment (Bandelin Sonoplus, Generator GM 2200, 200 W, 20 kHz, 60% power) a kinetic stable emulsion of an average droplet size of 165 nm and a viscosity of 40 mPas is obtained.

The emulsion is heated up to 40° C. and t-butyl hydroperoxide (0.38 g, 70% in $H_2O$) dissolved in 5 g of deionised water is added.

The emulsion is continuously stirred at 40° C. by a mechanical stirrer, while a solution of 0.57 g of sodium hydroxymethanesulfinate dissolved in 15 g of water is prepared. A portion of 30% of this solution is added at once, leading to an exotherm to 43° C. after 50 min. At this point, the remainder redox solution is added over a period of 1 hour at 40° C.

After addition, the reaction mixture is subsequently stirred at 60° C. for one hour, then cooled to RT. The pH of the dispersion is adjusted to 9.1 by addition of amine (0.9 g of AMP90) and filtered via a 20 μm filter. The resulting milky dispersion has a particle size $D_{INT}$ of 136 nm (dynamic light scattering DLS). The final active content of the dispersion is 20 wt % of Irganox 1010, the solid content is 40.5 wt % and the isolated yield is ca. 290 g.

The residual monomer content (main component MMA) is determined by headspace GC-MS at 46 ppm.

Example 3

Synthesis of Encapsulated Irganox 1076

80.0 g of Irganox 1076 is dissolved in 68.4 g of methyl methacrylate (MMA), 6.08 g of stearyl methacrylate (SMA), 0.23 g of 1,4-butanediol diacrylate and 1.52 g of methacrylic acid at 40° C. to a homogeneous solution. This oil phase is added slowly to a stirred solution of 20.13 g poly(oxy-1,2-ethanediyl), α-sulfo-o-hydroxy-, $C_{12}$-$C_{14}$-alkyl ethers, sodium salts (CAS no. 68891-38-3, 31 wt % active, 69 wt % water, Cognis Deutschland GmbH&Co. KG) in 202 g of deionised water. After stirring for 30 min and 20 min of ultrasound treatment (Bandelin Sonoplus, Generator GM 2200, 200 W, 20 kHz, 60% power) a kinetic stable emulsion of an average droplet size of 147 nm and a viscosity of 30 mPas is obtained.

The emulsion is heated up to 40° C. and t-butyl hydroperoxide (0.51 g, 70% in $H_2O$) dissolved in 5 g of deionised water is added.

The emulsion is continuously stirred at 40° C. by a mechanical stirrer, while a solution of 0.76 g of sodium hydroxymethanesulfinate dissolved in 15 g of water is prepared. A portion of 30% of this solution is added at once, leading to an exotherm to 44° C. after 28 min. At this point, the remainder redox solution is added over a period of 1 hour at 40° C.

After addition, the reaction mixture is subsequently stirred at 60° C. for one hour, then cooled to RT. The pH of the dispersion is adjusted to 8.4 by addition of amine (0.7 g of AMP90) and filtered via a 20 μm filter. The resulting milky dispersion has a particle size $D_{INT}$ of 177 nm (dynamic light scattering DLS). The final active content of the dispersion is 20 wt % of Irganox 1076, the solid content is 41.7 wt % and the isolated yield is ca. 390 g.

The residual monomer content (main component MMA) is determined by headspace GC-MS at 26 ppm.

Example 4

Synthesis of Encapsulated Irganox 1035

100.0 g of Irganox 1035 is dissolved in 85.5 g of methyl methacrylate (MMA), 7.6 g of stearyl methacrylate (SMA), 0.29 g of 1,4-butanediol diacrylate and 1.9 g of methacrylic acid at 40° C. to a homogeneous solution. This oil phase is added slowly to a stirred solution of 25.16 g poly(oxy-1,2-ethanediyl), α-sulfo-o-hydroxy-, $C_{12-14}$-alkyl ethers, sodium salts (CAS no. 68891-38-3, 31 wt % active, 69 wt % water, Cognis Deutschland GmbH&Co. KG) in 258 g of deionised water. After stirring for 30 min and 20 min of ultrasound treatment (Bandelin Sonoplus, Generator GM 2200, 200 W, 20 kHz, 60% power) a kinetic stable emulsion of an average droplet size of 143 nm and a viscosity of 30 mPas is obtained.

The emulsion is heated up to 40° C. and t-butyl hydroperoxide (0.631 g, 70% in $H_2O$) dissolved in 5 g of deionised water is added.

The emulsion is continuously stirred at 40° C. by a mechanical stirrer, while a solution of 0.95 g of sodium hydroxymethanesulfinate dissolved in 15 g of water is prepared. A portion of 30% of this solution is added at once, leading to an exotherm to 44° C. after 26 min. At this point, the remainder redox solution is added over a period of 1 hour at 40° C.

After addition, the reaction mixture is subsequently stirred at 60° C. for one hour, then cooled to RT. The pH of the dispersion is adjusted to 8.3 by addition of amine (0.7 g of AMP90) and filtered via a 20 μm filter. The resulting milky dispersion has a particle size $D_{INT}$ of 136 nm (dynamic light scattering DLS). The final active content of the dispersion is 20 wt % of Irganox 1035, the solid content is 39.8 wt % and the isolated yield is ca. 485 g.

The residual monomer content (main component MMA) is determined by headspace GC-MS at 18 ppm.

Application Example

Comparative evaluation of antioxidants in water based acrylic coatings—impact of solid state dispersions and encapsulated forms on gloss and paint clarity (haze)

Experimental:

The impact of Irgastab PVC 76 (aqueous solid state dispersion of Irganox 1076, 45% actives, particle size 1.6 μm) and product of Example 3 (encapsulated Irganox 1076, 20% actives) on gloss and paint clarity (haze) is evaluated in a water based acrylic clear coat. Both products are tested at concentrations typical for antioxidants, i.e. 0.2 wt % and 0.5 wt % actives based on the solids content of the paint formulation (solids content: 35%). For incorporation purposes the products are added to the finished paint whilst stirring (approx. 1000 rpm). Subsequently the paint formulations are applied onto pre-coated (black) aluminium panels resulting after cure in a dry film thickness of 50 μm.

For evaluation both the 60° gloss (DIN 67530) as well as the haze value are recorded. NOTE: the higher the haze value the lower the clarity of the paint. The results are summarized in the table below:

| Sample | 60° gloss | Haze value |
|---|---|---|
| No antioxidant | 80 | 68 |
| 0.2 wt %* Irgastab PVC 76 | 70 | 245 |
| 0.5 wt %* Irgastab PVC 76 | 57 | 301 |
| 0.2 wt %* Example 3 | 80 | 65 |
| 0.5 wt %* Example 3 | 79 | 72 |

*active substance

As it can be seen in the table, a solid state dispersion (state of the art, with Irgastab PVC 76) has a negative influence on the gloss and strong impact on the haze, which is increased. The encapsulated product form, example 3, does not influence the gloss nor the haze of the coating.

Formulation:

| Pos. | Trade name | Function | | w/w % |
|---|---|---|---|---|
| 1. | Acronal ® LR 8960 (50%) | Acrylic resin | (1) | 69.00 |
| 2. | Water, deionized | Solvent | — | 25.90 |
| 3. | AMP-90 ™ | Amine | (2) | 0.10 |
| 4. | Diethylene glycolmonoethylether | Solvent | — | 3.00 |
| 5. | Byk ® 347 | Wetting agent | (3) | 0.40 |
| 6. | Byk ® 028 | Defoamer | (3) | 0.50 |
| 7. | Tego Foamex ® 1488 | Defoamer | (4) | 0.50 |
| 8. | Coatex ® BR 100 P (50%) | Thickener | (5) | 0.60 |
| Total | | | | 100.00 |

Add 1.-8. in listed order while stirring with efficient agitation

Properties pH: 8.3

Solids: 35%

Suppliers (1) BASF SE (www.basf.com)

(2) Angus Chemical Company (www.dow.com/angus)

(3) Byk (www.byk.com)

(4) Evonik (www.tego.de)
(5) Coatex (www.coatex.fr)

What is claimed:

1. A concentrated aqueous polymer dispersion, comprising
a) a polymer carrier prepared by heterophase radical polymerization of at least one ethylenically unsaturated monomer in the presence of
b) a non-polar organic phenolic antioxidant, and
c) a non-ionic, cationic or anionic surfactant,
wherein:
a weight ratio of the non-polar phenolic antioxidant to the polymer carrier is equal to or greater than 30 parts of the phenolic antioxidant per 100 parts of the carrier;
a residual monomer content of the polymer carrier is below 2000 ppm; and
the dispersion has an average particle size of less than 1000 nm, and
wherein the phenolic antioxidant b) is represented by formula (A):

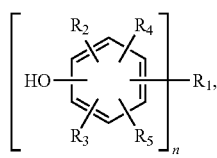
(A)

wherein:
$R_2$, $R_3$, $R_4$ and $R_5$ independently represent hydrogen, $C_5$-$C_8$cycloalkyl, $C_1$-$C_{12}$alkyl, or $C_1$-$C_{12}$alkyl substituted by at least one selected from the group consisting of S—$C_1$-$C_{12}$alkyl, O—$C_1$-$C_{12}$alkyl, CO—O—$C_1$-$C_{12}$alkyl, and O—CO—$C_1$-$C_{12}$alkyl;
n ranges from 1-4, such that:
when n is 1, then:
$R_1$ is
tertiary $C_4$-$C_{12}$alkyl,
$C_1$-$C_{22}$alkyl interrupted by -$A_5$-,
-$A_5$-phenyl,
-$A_5$-phenyl where the phenyl is substituted by $C_1$-$C_{12}$alkyl,
-$A_4$-phenyl where the phenyl is substituted by $C_1$-$C_{12}$alkanoyloxy, $C_3$-$C_{12}$alkenoyloxy, or both, and optionally further substituted by $C_1$-$C_{12}$alkyl; or
$R_1$ together with $R_5$ is $C_3$-$C_{22}$alkylene or $C_3$-$C_{22}$oxaalkylene attached with both open bonds to adjacent carbon atoms of the mono-hydroxyphenyl moiety; or
$R_1$ is represented by one of formulae (B) or (C):

-$A_3$-(O)$_m$—P(=O)$_p$(OA$_1$)(OA$_2$)  (B);

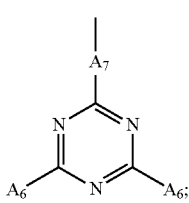
(C)

where m and p independently are 0 or 1;
$A_1$ and $A_2$ independently are $C_1$-$C_{12}$alkyl, phenyl, phenyl substituted by $C_1$-$C_{12}$alkyl, or an equivalent of an alkaline, alkaline earth or aluminum atom;
$A_3$ is a direct bond or $C_1$-$C_8$alkylene;
$A_4$ is selected from the group consisting of $C_1$-$C_8$alkylene, —O—, —NH—, —S—, —CO—, —COO—, —OCO—, —NHCO—, and —CONH—;
$A_5$ is selected from the group consisting of —O—, —NH—, —S—, —CO—, —COO—, —OCO—, —NHCO—, and —CONH—;
$A_6$ is selected from the group consisting of $C_1$-$C_{18}$alkoxy, $C_1$-$C_{18}$alkylthio and $C_1$-$C_{18}$alkylamino;
$A_7$ is —O— or —NH—;
when n is 2, then:
$R_1$ is
a $C_1$-$C_{20}$alkylene optionally interrupted, end-capped, or both, with at least one selected from the group consisting of —O—, —NH—, —S—, —CO—, —COO—, —OCO—, —NHCO—, —CONH—, -$L_1$-, phenylene, and phenylene which is substituted by at least one selected from the group consisting of $C_1$-$C_{12}$alkyl, $C_1$-$C_{12}$alkoxy, $C_7$-$C_{12}$alkanoyloxy, and $C_3$-$C_{12}$alkenoyloxy;
a divalent mono-, di- or tri-cycloalkylene group;
a divalent mono-, di- or tri-cycloalkylene group interrupted by —O—;
a spacer group —O—; —NH—; —S—; —CO—; —COO—; —OCO—; —NHCO—; —CONH—;
when n is 3, then:
$R_1$ is
a trivalent alkyl of 3 to 20 carbon atoms, said trivalent alkyl interrupted or end-capped with —O—, —NH—, —S—, —CO—, —COO—, —OCO—, —NHCO—, —CONH—, -$L_1$-, phenylene, or phenylene which is substituted by at least one selected from the group consisting of $C_1$-$C_{12}$alkyl, $C_1$-$C_{12}$alkoxy, $C_1$-$C_{12}$alkanoyloxy, and $C_3$-$C_{12}$alkenoyloxy; or
a trivalent group of the formulae (D), (E) or (F):

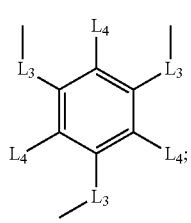
(D)

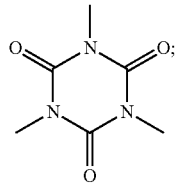
(E)

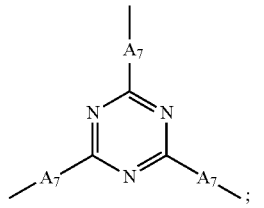
(F)

when n is 4, then:
$R_1$ is a tetravalent alkyl of 4 to 20 carbon atoms, said tetravalent alkyl optionally interrupted or end-capped with at least one selected from the group consisting of —O—, —NH—, —S—, —CO—, —COO—, —OCO—, —NHCO—, —CONH—, -L$_1$-, phenylene, and phenylene which is substituted by at least one selected from the group consisting of C$_1$-C$_{12}$alkyl, C$_1$-C$_{12}$alkoxy, C$_2$-C$_{12}$alkanoyloxy, and C$_3$-C$_{12}$alkenoyloxy;

L$_1$ is a group of formulae (G), (H) or (I):

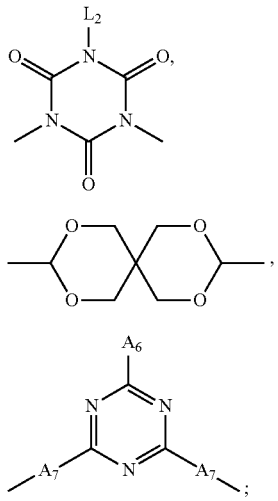

L$_2$ is OH, C$_1$-C$_{12}$alkyl, C$_1$-C$_{12}$alkoxy, C$_2$-C$_{12}$hydroxyalkyl, or C$_7$-C$_{12}$hydroxyalkoxy;

L$_3$ independently are C$_1$-C$_4$alkylene; and

L$_4$ independently are H or C$_1$-C$_4$alkyl.

2. The dispersion of claim 1, wherein the weight ratio of the non-polar organic phenolic antioxidant to the polymer carrier is equal or greater than 50 parts of the phenolic antioxidant per 100 parts of the carrier.

3. The dispersion of claim 1, wherein the residual monomer content of the polymer carrier is below 500 ppm.

4. The dispersion of claim 1, wherein the ethylenically unsaturated monomer is selected from the group consisting of a C$_1$-C$_{20}$ alkyl acrylate, a C$_1$-C$_{20}$alkyl methacrylate, acrylic acid, methacrylic acid, styrene, vinyltoluene, a hydroxy-functional acrylate, a hydroxy-functional methacrylate, an acrylate derived from at least one alkoxylated alcohol, a methacrylate derived from at least one alkoxylated alcohol, a multifunctional acrylate, a multifunctional methacrylate, and mixtures thereof.

5. The dispersion of claim 1, wherein the phenolic antioxidant b) is represented by formula (A'):

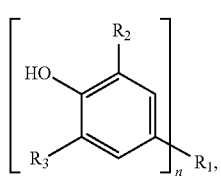

wherein:

R$_2$ and R$_3$ independently represent methyl, tert-butyl, or a methyl substituted by S-linear-C$_4$-C$_{12}$alkyl;

n is 1, 2 or 4;

when n is 1, then R$_1$ is a C$_4$-C$_{16}$alkyl interrupted by —S— or —OCO—;

when n is 2, then R$_1$ is C$_4$-C$_{16}$alkylene interrupted with at least one selected from the group consisting of —O—, —S—, —COO—, and —OCO—;

when n is 4, then R$_1$ is tetravalent alkyl of 5 to 20 carbon atoms interrupted by —COO—, —OCO—, or both.

6. A process for preparing the concentrated aqueous polymer dispersion of claim 1, the process comprising polymerizing the at least one ethylenically unsaturated monomer in the presence of the non-polar organic phenolic antioxidant and the non-ionic, cationic or anionic surfactant by a heterophase radical polymerization.

7. A polymer powder obtainable by vaporizing volatile components of the dispersion of claim 1.

8. A composition stabilized against thermal, oxidative or light-induced degradation, the composition comprising:

(a) an organic material susceptible to thermal, oxidative or light induced degradation; and (b) the dispersion of claim 1.

9. The composition of claim 8, wherein an amount of the non-polar organic phenolic antioxidant b) is from 0.1 to 40% by weight based on a weight of the polymer carrier a).

10. A powder coating composition stabilized against thermal, oxidative or light-induced degradation, the coating composition comprising:

a) a solid binder material; and b) the polymer powder of claim 7.

11. The composition of claim 8, further comprising an additive.

12. The composition of claim 11, wherein the additive is selected from the group consisting of a sterically hindered amine stabilizer, a UV-absorber, a phosphite, a phosphonite, a benzofuranone, an indolinone, a metal stearate, a metal oxide, a pigment, a dye, an organophosphorus compound, a hydroxylamine, a metal deactivator, a nitrone, a thiosynergist, a peroxide scavenger, a nucleating agent, a filler, a reinforcing agent, a plasticiser, a lubricant, an emulsifier, a rheology additive, a catalyst, a flow-control agent, an optical brightener, an antistatic agent, a blowing agent, a biocide, a slip- and leveling agent, a wetting agent, a dispersant, a defoamer, a matting agent, a wax, an anti skinning additive, an adhesion promoter, a coalescent, a rheology modifier, a sag control agent, a thixotropic agent, a flame retardant, and a mixture thereof.

13. A stabilizer against thermal, oxidative or light-induced degradation of an organic material, the stabilizer comprising the dispersion of claim 1.

14. A stabilizer against thermal, oxidative or light-induced degradation of a powder coating, the stabilizer comprising the polymer powder of claim 7.

* * * * *